(12) United States Patent
Wilson et al.

(10) Patent No.: US 7,308,511 B2
(45) Date of Patent: *Dec. 11, 2007

(54) SYSTEM FOR ALLOCATING RESOURCES IN A COMPUTER SYSTEM

(75) Inventors: Marc D Wilson, Seattle, WA (US); Ralph A Lipe, Woodinville, WA (US); Pierre-Yves Santerre, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 612 days.

This patent is subject to a terminal disclaimer.

(21) Appl. No.: 10/836,379

(22) Filed: May 3, 2004

(65) Prior Publication Data
US 2004/0205258 A1 Oct. 14, 2004

Related U.S. Application Data

(63) Continuation of application No. 08/531,669, filed on Sep. 21, 1995, now Pat. No. 6,763,454, which is a continuation-in-part of application No. 08/250,698, filed on May 27, 1994, now Pat. No. 5,787,246.

(51) Int. Cl.
G06F 3/00 (2006.01)

(52) U.S. Cl. .......................... 710/8; 710/10

(58) Field of Classification Search ............ 710/10, 710/17, 8
See application file for complete search history.

(56) References Cited

U.S. PATENT DOCUMENTS

| | | | |
|---|---|---|---|
| 4,268,901 A | 5/1981 | Subrizi et al. |
| 4,317,183 A | 2/1982 | Shimizu et al. |
| 4,562,535 A | 12/1985 | Vincent et al. |
| 4,589,063 A | 5/1986 | Shah et al. |
| 4,604,690 A | 8/1986 | Crabtree et al. |
| 4,660,141 A | 4/1987 | Ceccon et al. |
| 4,727,475 A | 2/1988 | Kiremidjian |
| 4,727,480 A | 2/1988 | Albright et al. |
| 4,730,251 A | 3/1988 | Aakre et al. |
| 4,930,159 A | 5/1990 | Kravitz et al. |
| 4,974,151 A | 11/1990 | Advani et al. |
| 4,982,325 A | 1/1991 | Tignor et al. |
| 5,014,193 A | 5/1991 | Garner et al. |
| 5,038,294 A | 8/1991 | Arakawa et al. |

(Continued)

OTHER PUBLICATIONS

Anderson et al, Support for continuous media in the DASH system, 1990, IEEE.*

(Continued)

*Primary Examiner*—Kim Huynh
*Assistant Examiner*—Dean Phan
(74) *Attorney, Agent, or Firm*—Banner & Witcoff, Ltd.

(57) ABSTRACT

A system for allocating resources for use by devices of a computer. Device information for the devices of the computer is collected to uniquely identify the devices and to describe the device characteristics associated with the operation of those devices with the computer. A list of device configurations is constructed in response to the collection of device information. Each device is represented by at least one device configuration, which defines the resource element requirements for the corresponding device. Computer resources, which support the functions of the devices within the computer, are allocated based upon the device configurations and the availability of the desired resources. This allocation process prevents a potential conflicting use of computer resources by the installed devices.

6 Claims, 17 Drawing Sheets

U.S. PATENT DOCUMENTS

| | | |
|---|---|---|
| 5,109,484 A | 4/1992 | Hughes et al. |
| 5,136,709 A | 8/1992 | Shirakabe et al. |
| 5,157,384 A | 10/1992 | Greanias et al. |
| 5,161,102 A | 11/1992 | Griffin et al. |
| 5,197,093 A | 3/1993 | Knuth et al. |
| 5,235,639 A | 8/1993 | Chevalier et al. |
| 5,247,682 A | 9/1993 | Kondou et al. |
| 5,249,270 A | 9/1993 | Stewart et al. |
| 5,252,951 A | 10/1993 | Tannenbaum et al. |
| 5,257,368 A | 10/1993 | Benson et al. |
| 5,257,379 A | 10/1993 | Cwiakala et al. |
| 5,257,387 A * | 10/1993 | Richek et al. .............. 713/600 |
| 5,263,148 A | 11/1993 | Jones et al. |
| 5,289,372 A | 2/1994 | Guthrie et al. |
| 5,297,262 A | 3/1994 | Cox et al. |
| 5,319,790 A | 6/1994 | Kumagai |
| 5,335,350 A | 8/1994 | Felderman et al. |
| 5,359,713 A | 10/1994 | Moran et al. |
| 5,371,492 A | 12/1994 | Lohrbach et al. |
| 5,379,431 A | 1/1995 | Lemon et al. |
| 5,386,551 A | 1/1995 | Chikira et al. |
| 5,386,567 A * | 1/1995 | Lien et al. .................. 713/100 |
| 5,394,556 A | 2/1995 | Oprescu |
| 5,408,618 A | 4/1995 | Aho et al. |
| 5,412,798 A | 5/1995 | Garney |
| 5,420,987 A | 5/1995 | Reid et al. |
| 5,428,748 A | 6/1995 | Davidson et al. |
| 5,432,941 A | 7/1995 | Crick et al. |
| 5,450,570 A | 9/1995 | Richek et al. |
| 5,452,454 A | 9/1995 | Basu et al. |
| 5,454,078 A | 9/1995 | Heimsoth et al. |
| 5,459,867 A | 10/1995 | Adams et al. |
| 5,459,869 A | 10/1995 | Spilo |
| 5,469,545 A | 11/1995 | Vanbuskirk et al. |
| 5,471,675 A | 11/1995 | Zias |
| 5,485,460 A | 1/1996 | Schrier et al. |
| 5,491,813 A | 2/1996 | Bondy et al. |
| 5,517,636 A | 5/1996 | DeHart et al. |
| 5,517,646 A | 5/1996 | Piccirillo et al. |
| 5,542,055 A | 7/1996 | Amini et al. |
| 5,548,759 A | 8/1996 | Lipe |
| 5,553,281 A | 9/1996 | Brown et al. |
| 5,581,261 A | 12/1996 | Hickman et al. |
| 5,615,389 A | 3/1997 | Mayfield et al. |
| 5,655,148 A | 8/1997 | Richman et al. |
| 5,659,786 A | 8/1997 | George et al. |
| 5,787,246 A | 7/1998 | Lichtman et al. |
| 5,815,731 A | 9/1998 | Doyle et al. |
| 5,826,082 A | 10/1998 | Bishop et al. |
| 5,881,252 A | 3/1999 | Sahgal et al. |

OTHER PUBLICATIONS

"CardWare User Manual 1.50A." released on Oct. 8, 1993 by Award software International, Inc., pp. 1-33.

D.P. Anderson, et al., "Support for Continuous Media in the DASH System", IEEE, pp. 54-61.

* cited by examiner

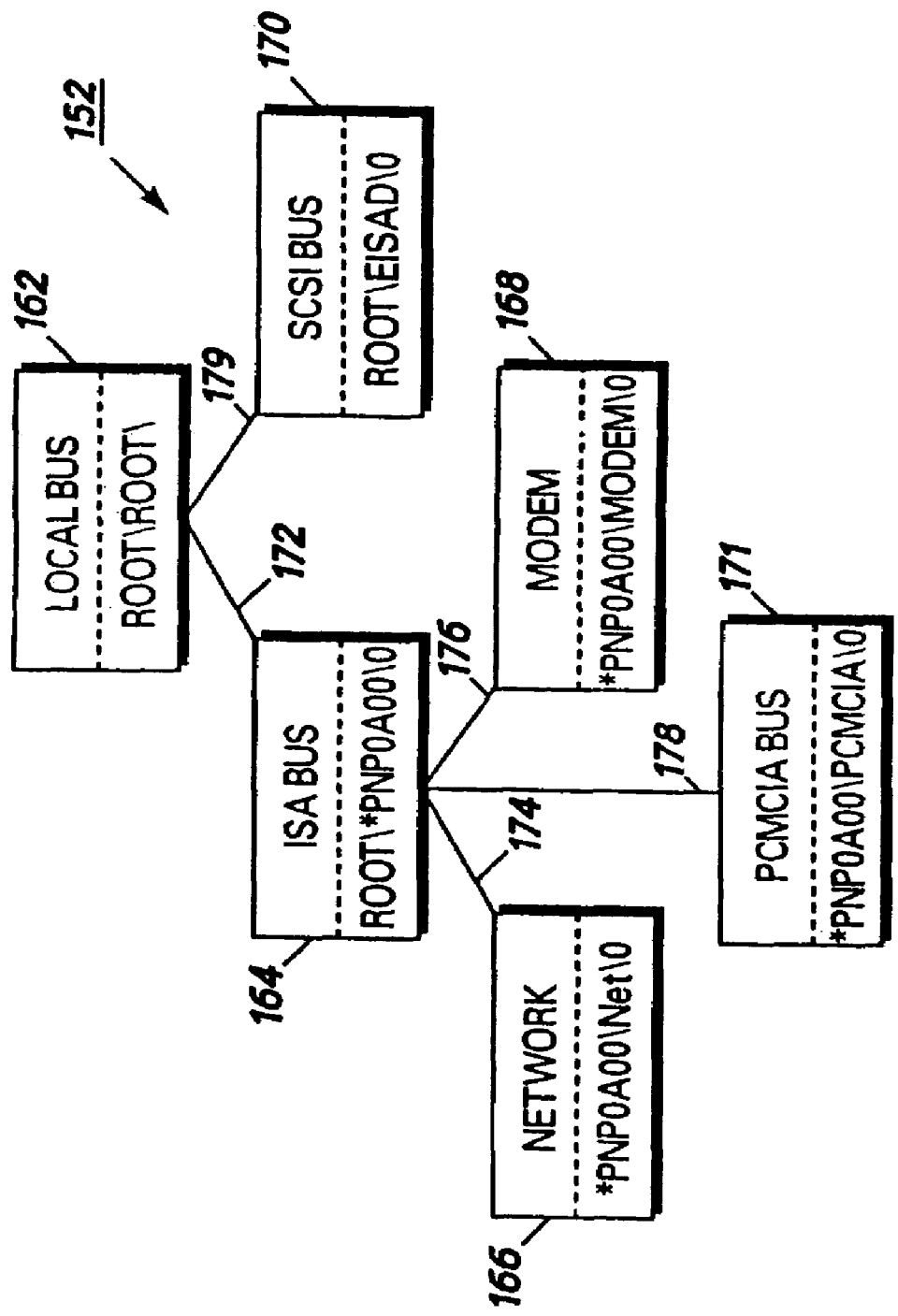

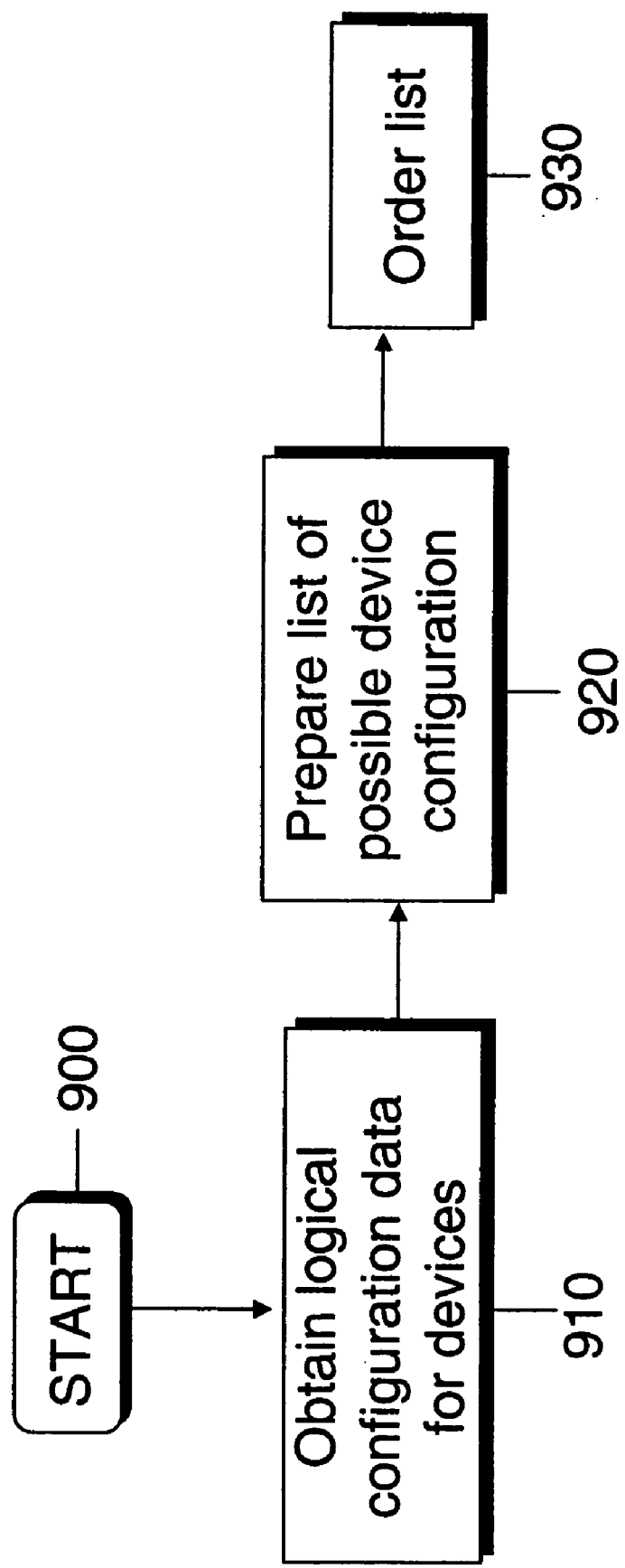

SYSTEM FOR ALLOCATING RESOURCES IN A COMPUTER SYSTEM

RELATED APPLICATION

This application is a Continuation and claims priority to U.S. Ser. No. 08/531,669, filed Sep. 21, 1995, now U.S. Pat. No. 6,763,454, issued Jul. 13, 2004, incorporated herein in its entirety, which is a continuation-in-part application of U.S. Ser. No. 08/250,698, filed May 27, 1994, now U.S. Pat. No. 5,787,246, issued Jul. 28, 1998, incorporated herein in its entirety.

TECHNICAL FIELD

The present invention relates to data processing systems and, more particularly described, relates to allocating resources for use by devices of a computer system.

BACKGROUND OF THE INVENTION

The process of installing a peripheral device or an add-on type adapter board for use with a personal computer can be a relatively frustrating experience for the typical computer user. Nevertheless, a computer typically will not operate with a newly installed component until the user has completed a proper allocation of resources. Computer resources are allocated during a configuration process to permit the conflict-free use of the limited resources. To configure the computer, the user often must complete a relatively complex series of technical tasks. Thus, the difficulties faced by many users during the configuration process are emphasized by the absence of an automated process for resolving resource conflicts.

For many personal computers, neither the operating system nor the application programs running on the computer can determine which hardware components are connected to the computer. Likewise, the various hardware components connected to the computer often fail to detect the occurrence of a conflict between different hardware devices that attempt to share the same resource. Accordingly, a user typically must resolve a resource conflict by first identifying the problem and thereafter experimenting with hardware and software configurations in an attempt to correct the resource conflict.

When attempting to tackle hardware and software integration issues, the user is exposed to technical concepts that can be somewhat confusing for those without technical training, such as computer architecture issues, including hardware interrupts, direct memory access (DMA) channels, memory addresses, and input/output (I/O) ports. Likewise, many common configuration tasks require the user to be familiar with the finer details of the computer's operating system, including system configuration files, such as AUTOEXEC.BAT, CONFIG.SYS, and .INI files. In view of these technical concepts, some users find the configuration process so intimidating that they refuse to consider upgrading a component of their personal computer or connecting a new peripheral device to add a new capability to their computer.

Unlike today, early personal computers required minimum coordination between the computer hardware and software components. Users were presented with few difficult configuration issues after the initial installation of the computer. A limited number of peripheral devices were commercially available for supplementing the processing functions of the personal computer. In addition, early personal computers were primarily used for dedicated tasks, such as word processing or calculating financial information with a spreadsheet program, at a fixed desktop location.

In contrast, present computers are often portable systems that can be regularly connected to different peripheral devices and external systems. There exists many more computer peripheral devices that require the use of resources during computer operation than the limited quantity of available resources. Furthermore, a user can harness the powerful computing operations of a present personal computer to complete numerous tasks outside the traditional realm of word processing and financial calculations, such as graphics, audio, and video. For example, numerous peripheral devices and add-on systems are now commercially available to enable the user to customize the functions and operating characteristics of a personal computer. Docking-type computers enable a user to operate a mobile computer at either a base station or in remote locations. Thus, the rapid acceptance of portable computing and the multi-faceted uses of the personal computer emphasize the need for supplying a "user friendly" system that configures new hardware or software devices for use with the computer.

The Industry Standard Architecture (ISA) standard is a widely used bus architecture for personal computers. The ISA expansion bus, which is commonly associated with the IBM Personal Computer AT and other compatible computers, provides a 16-bit bus that supports the connection of adapter boards within the computer. The ISA bus structure requires allocation of resources, such as hardware interrupts, DMA channels, memory addresses, and I/O ports, among multiple ISA-compatible adapter boards connected to the ISA expansion bus. However, the ISA standard does not define a hardware or software mechanism for allocating those resources for use by the installed adapter boards. Consequently, configuration of the ISA adapter boards is typically completed by connecting jumper blocks or changing switch settings on the boards to change the decode maps for memory and I/O ports and to direct the DMA channels and interrupt signals to various pins along the expansion bus. Furthermore, system configuration program files of the operating system may need to be updated to reflect any modifications to the resource allocation.

Alternative expansion bus standards, such as the Micro Channel Architecture (MCA) and the Extended Industry Standard Architecture (EISA) standards, have limited hardware and software mechanisms to identify resources requested by a peripheral device and to resolve resource conflicts. However, these mechanisms are not implemented by the computer's operating system and are not compatible with the large installed base of personal computers based on the ISA standard. Furthermore, computers implementing the MCA and EISA standards are generally more expensive than ISA-compatible computers and lack the variety of add-on adapter boards and peripheral devices available for use with ISA-compatible computers.

To address the issue of configuration management, the computer industry is at present offering full-featured computers having preconfigured hardware and preinstalled software, thereby eliminating the need for a user to conduct the installation and configuration tasks for the purchased computer. However, this is a somewhat limited solution because vendors typically market a computer having a standard configuration of hardware and software components. Thus, this approach defeats the flexibility offered by the ISA bus expansion structure because users cannot obtain a computer capable of performing a customized function through this standardized configuration approach.

To overcome the frustration of users with present complicated configuration processes, it would be desirable to provide a system for "automatically" configuring a peripheral device or adapter board for a computer. A system is needed to enable a user to simply connect a device to the computer, turn on the computer, and have the device properly work with the computer. This system would determine the optimal configuration for its resources and enables application programs to fully utilize the available resources.

In recognition of the problems of prior configuration processes, the present invention provides a system that permits easy installation and configuration of devices which are capable of identifying themselves and declaring their services and resource requirements to the computer. The device identification and resource requirement information enable the system to determine and establish a working configuration for all devices connected to the computer. Accordingly, the present invention efficiently allocates system resources between the devices of the computer without substantial user intervention.

SUMMARY OF THE INVENTION

Problems associated with the manual installation and configuration of adapter boards and peripheral devices for computers are solved by the principles of the present invention. The present invention provides a system for allocating resources to support conflict-free operation by the components of a computer. The present invention addresses the needs of computer users by supplying a computer-implemented process for allocating resources for use by devices of a computer and for supporting dynamic configuration changes of the computer.

A system constructed in accordance with the present invention allocates resources for use by devices of a computer. The computer includes various resources, including interrupts, direct memory access (DMA) channels, memory addresses, and input/output (I/O) ports, at least one system bus, and devices. System busses are components that supply physical connections to devices. Each of the devices is connected to one of the system busses of the computer.

The system busses can be compatible with a variety of bus architectures, including the Industry Standard Architecture (ISA), Micro Channel Architecture (MCA) and Extended Industry Standard Architecture (EISA) bus standards, as well as Personal Computer Memory Card International Association (PCMCIA), Small Computer Systems Interface (SCSI), Personal Computer Interface (PCI), Enhanced Capabilities Parallel (ECP), Vesa Local Bus (VL), Integrated Drive Electronics (IDE), and other bus standards. Devices supply the functions of system-level components, such as fixed and floppy disk controllers, display, keyboard, and mouse controllers, and serial and parallel controllers, and implement the functions offered by numerous add-on type adapter boards and peripheral devices.

Briefly described, device information is collected for each of the devices of the computer. This device information acquisition process permits the unique identification of the devices and the description of device characteristics associated with the operation of devices with the computer. A device driver, which enables communications between a corresponding device and the computer, is thereafter identified for each of the devices in response to the device information. The resources, which support the functions of the devices within the computer, are allocated based upon the device information. This allocation process prevents any potential conflicting use of resource elements by the devices. In response to resource allocation, the devices are configured and device drivers are loaded to support the operation of these devices.

More particularly described, devices of a computer are configured based upon the collection of information about the devices and their connections to the system busses of the computer. To collect the device information, a particular device is detected on the system bus of interest and thereafter assigned a device identification code that identifies the particular device as being connected to the selected system bus. At least a portion of the device identification code, specifically the identification code, uniquely identifies the detected device. Logical configuration data, which supplies configuration requirements for operating the particular device with the computer, is also obtained for the detected device. This collection process is repeated until device information is eventually collected for each of the devices for all system busses of the computer.

The device information is stored within computer memory, such as volatile memory, to support the present configuration operation. At least a portion of the system memory is allocated for the storage of device information within a tree-like structure of device nodes. Each device connected to the computer is represented by a device node that stores associated device information. Furthermore, if an identified device represents a newly installed device for the computer, then this device information also can be stored in nonvolatile computer memory, such as a fixed disk, to supply an archival source of such information for future configuration tasks. A computer database known as a registry is typically used to store this archival device information.

The collection of device information supplies data that supports the identification of device drivers for the identified devices. A device driver can be obtained from one of several alternative sources of the computer, including selected files of the operating system installed on the computer, the device itself, a computer database maintained by the computer, or from the user via a disk containing the device driver. In general, the device driver for a device is often obtained by accessing a selected program file stored on either a fixed disk or another type of mass memory storage device of the computer.

The resources of the computer system represent a finite set of resource elements. Certain devices require access to specific resource element for proper operation with the computer. For example, a typical device configuration requirement for a modem defines specific interrupt elements, such as IRQ2 and IRQ3, for proper operation of the modem with a computer. Accordingly, the logical configuration data for certain devices may specify specific resource elements and, for others, the logical configuration data may define general resource requirements. Resource elements are considered to be "reserved" if they are maintained for use only by certain predetermined devices, such as selected devices that are activated only after a computer boot. In contrast, resource elements are considered to be "nonreserved" if they are maintained for use by any device.

An arbitration process allocates resource elements for use by devices of the computer in a manner that satisfies the configuration requirements of each device and avoids a potential conflicting use of the resource elements. The configuration requirements for the devices are defined by the logical configuration data collected from the devices of the computer. Although the arbitration process is implemented as an iterative routine, the process can be generally viewed as a mechanism of allocating resource elements based upon the availability of those resource elements. A resource element is available to satisfy the requirement for a nonreserved resource element of a device configuration if that resource element is neither reserved for use by another device nor assigned for use by another device. Likewise, a resource element is available for satisfying the requirement of a reserved resource element of a device configuration if that element is reserved for possible use by the device. It will be appreciated that the reserved resource elements represent a prioritized set of the resource elements that are held in reserve for possible use by selected devices, whereas the nonreserved resource elements representing the remaining resource elements.

For the selected resource, the arbitration method then completes one or more arbitration tasks based on the availability of resource elements and the resource element requirements defined by a list of device configurations. The logical configuration data supports the definition of a device configuration associated with each device. In turn, the device configurations define requirements for the resource elements necessary support the operation of corresponding devices with the computer. First, an arbitration task is conducted to determine whether one of the nonreserved resource elements is available to satisfy the resource element requirement for a selected device configuration and whether other nonreserved resource elements are available to satisfy the resource element requirements for the remaining device configurations. A nonreserved resource element is available if the nonreserved resource element is not listed in an allocated resource list that specifies the resource elements allocated for use by the devices of the computer. If available, then this nonreserved resource element is allocated to the selected device configuration and other available nonreserved resource elements are allocated to the remaining device configurations. Each nonreserved resource element is allocated by adding an entry representing the nonreserved resource element to a temporary storage list during the arbitration process. These entries are then transferred to the allocated resource list in response to a successful allocation of resource elements.

Otherwise, a second arbitration task is completed to determine whether one of the reserved resource elements is available to satisfy the resource element requirement for the selected device configuration and whether nonreserved resource elements are available to satisfy the resource element requirement for the remaining device configurations. A reserved resource element is available if (1) the reserved resource element is listed in a reserved resource list that specifies the resource elements allocated for possible use by the devices of the computer, and (2) is not listed in the allocated resource list. If available, then the reserved resource element is allocated to the selected device configuration and available nonreserved resource elements are allocated to the remaining device configurations. A reserved resource element is allocated by adding an entry representing the reserved resource element to a temporary storage list during the arbitration process. These entries are then transferred to the allocated resource list in response to a successful allocation of resource elements.

Otherwise, another arbitration task is completed to determine whether a nonreserved resource element is available to satisfy the resource element requirement for the selected device configuration and whether either nonreserved resource elements or reserved resource elements are available to satisfy the resource element requirements for the remaining device configurations. If so, then the available nonreserved resource element is allocated to the selected device configuration, and the available nonreserved resource elements or reserved resource elements are allocated to each of the remaining device configurations.

Otherwise, a final arbitration task is completed to determine whether one of the reserved resource elements is available to satisfy the resource element requirement for the selected device configuration and whether either nonreserved resource elements or reserved resource elements are available to satisfy the resource element requirements for the remaining device configurations. If so, then the available reserved resource element is allocated to the selected device configuration, and the available nonreserved resource elements or reserved resource elements are allocated to the remaining device configurations. Otherwise, a configuration failure is declared because resource elements are not available to satisfy the resource element requirements defined by the device configurations.

The list of device configurations can be sorted prior to the start of the arbitration tasks to facilitate the resource arbitration process. To build the list of device configurations, logical configuration data is obtained for each of the devices. The list of device configurations is then prepared in response to the logical configuration data. The list of device configurations is sorted based on the complexity of the resource elements for each of the device configurations. The list of device configurations is typically ordered from the device configuration having the least resource element complexity to the device configuration having the most resource element complexity.

The resource arbitration process is supported by arbitrators that operate to determine the assignment of resource elements to the devices of the computer. An arbitrator can be assigned to each resource of the computer and is responsive to the resource element requirements of the device configurations to support the conflict-free allocation of resource elements. The arbitrator for a selected resource is programmed to recognize the characteristics of its resource. For example, the arbitrator for an interrupt resource of a conventional personal computer can recognize that this particular resource includes a certain number of interrupt elements.

An arbitrator, responsive to a list of device configurations, determines whether the resource elements are available to satisfy the resource element requirements defined by the device configurations. In turn, the arbitrator allocates the available resource elements in the event that resource elements are available to satisfy the resource element requirements defined by the device configurations. In contrast, the arbitrator generates an error message representing configuration failure in the event that the arbitrator fails to determine that resource elements are available to satisfy the resource element requirements.

In furtherance of these principles, it is an object of the present invention to provide a system for allocating resources for use by devices of a computer.

It is a further object of the present invention to provide a system that determines a conflict-free allocation of resources for use by the devices of the computer.

It is a further object of the present invention to provide a system that compares the resource requirements for devices with the available resources in the computer to determine a conflict-free allocation of resources for use by the devices.

That the present invention accomplishes these objects and offers the above-described advantages will be apparent to those skilled in the art from the following description, the appended claims, and the accompanying drawings.

BRIEF DESCRIPTION OF THE DRAWINGS

FIGS. 5A and 5B are diagrams that illustrate one of the components of the operating system shown in FIG. 4, specifically a hardware tree comprising device nodes for storing device-related information for the present configuration of the computer.

FIG. 9 is a logical flow diagram that illustrates the steps of a method for developing an ordered list of device configurations in accordance with the present invention.

DETAILED DESCRIPTION

Figure 1:
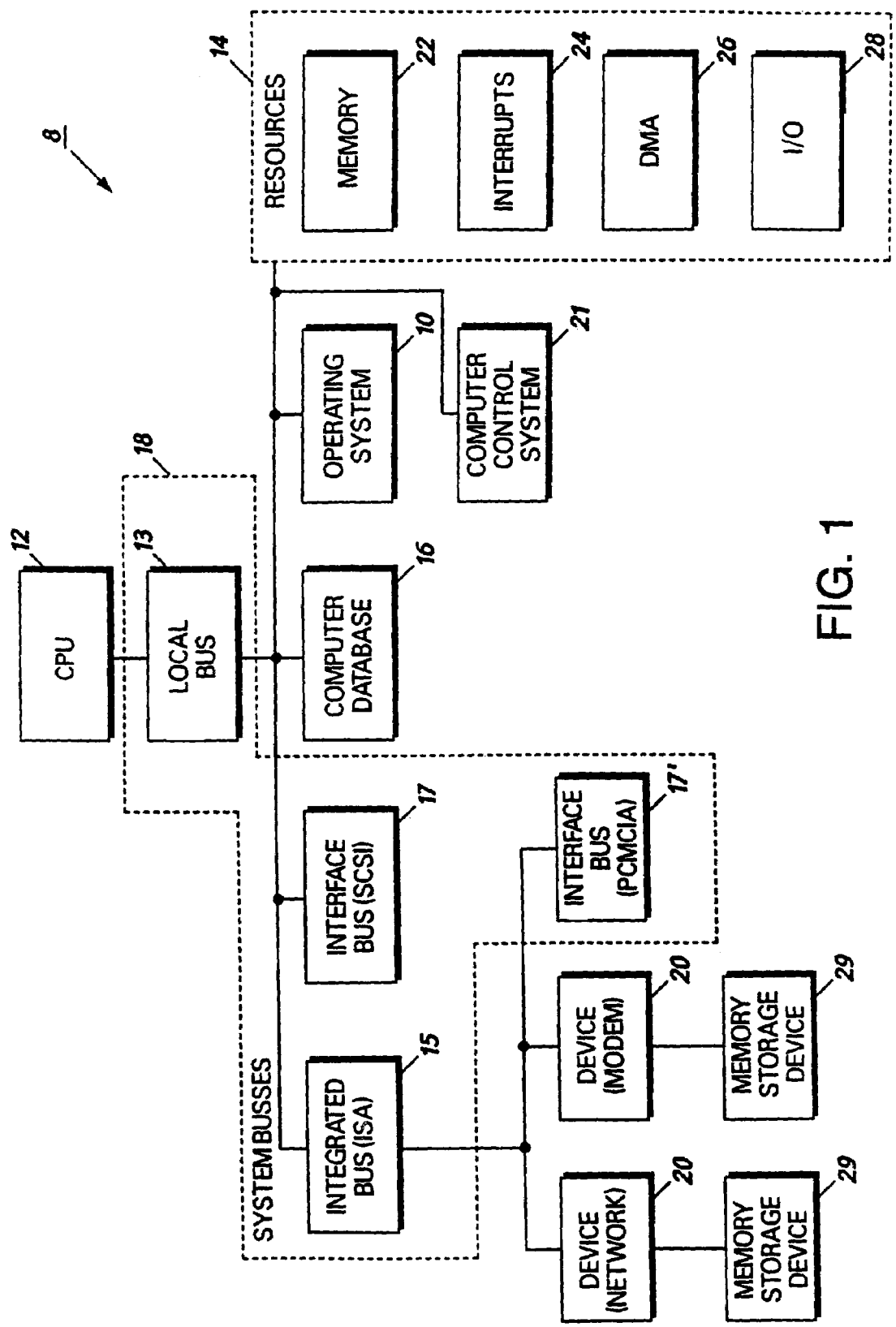
FIG. 1 is an overall block diagram of a computer in which the preferred embodiment of the present invention is operative.

To overcome the frustration of users with the present complicated and technical configuration processes for personal computers, the present invention provides a system for configuring a peripheral device or an add-on type adapter board for use with a base or mobile computer. In general, the present invention enables a user to connect a new device to the computer, power the computer, and have the device properly work with the computer without substantial user intervention. To provide this capability, the present invention determines a successful allocation of resources and enables the devices and the application programs to fully utilize the available resources. This can be accomplished for numerous computer bus architectures and types of devices.

The detailed description which follows is presented largely in terms of methods, processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These descriptions and symbolic representations are the means used by those skilled in the art of computer programming and computer construction to most effectively convey teachings and discoveries to others skilled in the art.

For the purposes of this discussion, a "process" or "method" is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files or the like. It should be kept in mind, however, that these and similar terms should be associated with appropriate physical quantities for computer operations, and that these terms are merely conventional labels applied to these physical quantities that exist within the computer.

It should also be understood that manipulations within the computer are often referred to in terms such as adding, comparing, moving, etc. which are often associated with manual operations performed by a human operator. The operations described herein are machine operations typically performed in conjunction with a human operator or user that interacts with the computer. The machines used for performing the operation of the present invention, as will be understood, include general purpose digital computers or other similar computing devices.

Furthermore, it should be kept in mind that there is a distinction between the methods, steps, or operations completed by a computer, and the method of computation itself. The present invention relates to methods, processes, steps, or operations for a computer and the processing of electrical or other physical signals to generate desired physical signals and to display results and interactions.

In addition, it should be understood that the programs, algorithms, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Automated Configuration System

FIG. 1 shows a block diagram of the preferred operating environment, a computer 8, for the preferred embodiment of the present invention. The present invention is based upon computer-implemented processes that can be embodied in one or more program modules for a data processing system, such as the computer 8, to carry out the methods and functions described herein. This computer-implemented process operates upon electrical or other physical signals to generate the desired physical results.

Referring now to FIG. 1, the computer 8 runs an operating system 10 that operates with a central processing unit (CPU) 12, resources 14, system busses 18, devices 20, and a computer control system 21. The resources 14 include memory addresses for a memory 22, interrupts 24, direct memory access (DMA) channels 26, and input/output (I/O) ports 28. The system busses 18 typically include a local bus 13, an integrated bus 15, such as a system-level expansion bus, and at least one interface bus 17. The computer 8 represents a typical configuration for a conventional personal computer and it will be understood that the present invention is not limited to operations with the disclosed configuration for the computer 8. Indeed, the computer 8 is intended to be representative of a broad category of data processing devices.

The operating system 10 comprises a set of program modules that control the internal functions of the computer 8, thereby allowing the computer 8 to run application software (not shown). For the preferred embodiment, the operating system 10 is a graphic-based operating system having a graphical user interface (GUI), such as the "NOWS" operating system available from the assignee for this application, Microsoft Corporation, Redmond, Wash. The operating system 10 is preferably installed on a mass memory storage device, such as a fixed disk or a CD-ROM, of the computer 8. During computer operations, the operating system 10 is also allocated a portion of the memory 22 to support operations with other components of the computer 8.

The CPU 12 is typically implemented as a microprocessor, such as the models 80386, 80486 or "PENTIUM" processor that are available from Intel Corporation, Santa Clara, Calif. The CPU 12 operates in combination with program modules, such as the operating system 10 and application programs, to control the operations of the computer 8. One or more of the system busses 18 support communications of control, address, and data signals between the CPU 12 and the remaining components of the computer 8. In addition, the system busses 18 support the distribution of electrical power to connected components.

The resources 14 represent the finite quantity of resources of a conventional personal computer, such as the computer 8. The memory 22 is typically implemented by dynamic or volatile memory modules, such as random access memory (RAM), and static or nonvolatile memory modules, such as read only memory (ROM) units. The memory 22 preferably includes a conventional memory, which is the first 1024 kilobytes of dynamic memory in a personal computer, and an extended memory that extends above the 1024 kilobytes range. The interrupts 24, also referred to as the interrupt request lines, are signal paths within the computer 8 that carry signals informing the recipient that the sender is ready to transmit or to receive data The DMA channels 26 enable the devices 20 or a computer program running on the computer 8 to access the memory 22 without involvement by the CPU 12, thereby supporting relatively fast data transfers. The I/O ports 28 represent ports used for internal communications with the CPU 12.

The computer database 16 provides a central location for storage of archival information that supports the configuration of the devices 20. Specifically, the computer database 16 stores general system hardware and software parameters, as will be described in more detail below with respect to FIG. 8. The computer database 16 is preferably implemented by nonvolatile memory, such as a fixed disk, or CD-ROM, or another type of mass storage memory device.

The system busses 18 can be implemented as various bus architectures, such as the Industry Standard Architecture (ISA), Micro Channel Architecture (MCA), and Extended Industry Standard Architecture (EISA) standards, as well as Personal Computer Memory Card International Association (PCMCIA), Small Computer Systems Interface (SCSI), Personal Computer Interface (PCI), Enhanced Capabilities Parallel (ECP), Vesa Local Bus (VL), Integrated Drive Electronics (IDE), and other bus standards. The system busses 18 also can include local or personal computer (PC) busses, serial busses, and parallel busses. The system busses 18 typically supply the signal paths for the exchange of data, control signals, and addressing information among the components of the computer 8 and peripheral components, including the devices 20. It will be understood that the present invention is not limited to operation with the above-described busses, and that these busses are merely listed as representative of existing bus architectures.

The system busses 18 can include the local bus 13, the integrated bus 15, and a pair of interface busses 17 and 17'. The integrated bus 15 is preferably an integrated or "fixed" expansion-type bus that enables the direct connection of peripheral devices or adapter boards to the "motherboard" of the computer 8. In contrast, the interface busses 17 and 17' are typically supplied by vendors as separate accessory or optional components that can be attached to the computer 8 via the local bus 13 or the integrated bus 15. Nevertheless, both the interface busses 17 and 17' permit the connection of additional devices to the computer 8. For the representative computing environment shown in FIG. 1, the integrated bus 15 is implemented as an ISA bus and is connected to the local bus 13 on the system board of the computer 8. In addition, the interface busses 17 and 17' are respectively implemented as a SCSI bus and a PCMCIA bus. In particular, the SCSI bus is connected to the local bus 13 and the PCMCIA bus is connected to the integrated bus 15.

The devices 20, which are connected to the system busses 18, represent the logical functions of components that can be connected to a personal computer. The devices 20 include components typically located on or connected to a motherboard or system board of a personal computer, including system-level devices, such as I/O controllers (fixed and flexible disk controllers), keyboard controller, serial and parallel controllers, system timer, display controller, programmable interrupt controller (PIC), and DMA controller. The devices 20 further include the functional devices for peripheral adapter boards and interface boards. Thus, for the representative computing environment shown in FIG. 1, the devices 20 include system-level devices (not shown), a modem card, and a network card.

A device 20 also can be implemented as a system bus 18 that is connected to another system bus. For example, in the computer 8, the PCMCIA bus is connected to the ISA bus and is capable of supplying a connection to the computer 8 for other devices. Thus, the PCMCIA bus represents both a system bus 18 and a device 20 within the computer 8. Likewise, both the ISA bus and the SCSI bus may be viewed as a system bus 18 and a device 20. Following the earlier analogy to "parent" and "child" components, it will be appreciated that a system bus 18 may be both a "parent" and a "child" within the preferred operating environment of the computer 8.

Although each of the devices 20 are shown in FIG. 1 as separate physical components, it will be understood that a computer component can contain more than one function and, accordingly, that a component can contain more than one of the devices 20. Thus, it will be useful to consider the device 20 as a "logical" device rather than as a physical device. It will be understood that the devices 20 supply the building blocks that are required to harness the computing power offered by the CPU 12 and the resources 14.

With the exception of system-level devices, which are typically supplied as part of the system board of the computer 8, a device 20 can be connected to a memory storage device 29, such as a ROM or a register, for storing information about the associated device 20. The memory storage device 29 is useful for storing device-related information that supports the configuration of the devices within the computer 8. This device information typically includes one or more strings of characters for uniquely identifying a corresponding device and resource usage data. For devices on adapter boards, the memory storage device 29 is preferably mounted on the board itself.

The inventors believe that the actual implementation of the memory storage device 29 can be any type of circuit or component that allows the device information to be accessed to support configuration operations. Typical data storage components include ROMs, registers, and other conventional memory components. Furthermore, the device-related information also can be "stored" by constructing circuitry that represents a "hard-wired" version of such information. Device information can be stored in a device-dependent fashion. Accordingly, it will be understood that the memory storage device 29 is not limited to the above-described implementations.

The computer control system 21 conducts initialization and test functions, as well as device configuration functions, when the computer 8 is first powered or "booted." Upon booting the computer 8, one or more start-up programs begin to run to implement necessary initialization and test functions. These start-up programs may be implemented as stand-alone programs or are integrated to function within the framework of the operating system 10.

The start-up programs typically include a basic input/output system (BIOS) program and a power-on self-test (POST) program. The BIOS program supplies device-level control or support services for the primary input/output devices of the computer during the boot "initialization" process. Furthermore, after boot, the BIOS program accepts requests from program modules, such as application programs or the operating system, and performs input/output services as requested by those modules. The POST program conducts a sequence of tests for certain system-level devices and resources, including memory, to verify the proper operation of the computer components that are required to be active upon completion of the boot process. The programs associated with the computer control system 21 are preferably stored in ROM located within the computer 8, typically on the computer motherboard. The functions and operations of conventional BIOS and POST programs are well known and will not be further described herein. As described in more detail below, the computer control system 21 preferably includes a modified BIOS program that is further capable of (1) configuring the boot-level devices of the computer 8 and, if required, (2) detecting the insertion or removal of the computer 8 from a docking station or an expansion system.

When viewed collectively, the CPU 12, the resources 14, a fixed disk including the computer database 16, the system busses 18, and the devices 20 represent the hardware components for a typical personal computer as embodied by the computer 8. The devices 20, which are connected to system busses 18, perform their respective functions by operating with the resources 14. Proper operation of the devices 20 generally requires the conflict-free allocation of the finite supply of resource elements of a conventional computer. In view of the relative technical complexity of the typical personal computer, it will be appreciated that there is a need for a system for allocating resources for use by devices of a computer without substantial support by the user. The inventors' solution for this problem is a configuration system that determines the resource requirements of the devices and attempts to allocate available resources to satisfy these requirements. This configuration system is supported by the computer-implemented processes of the operating system 10.

Figure 2:
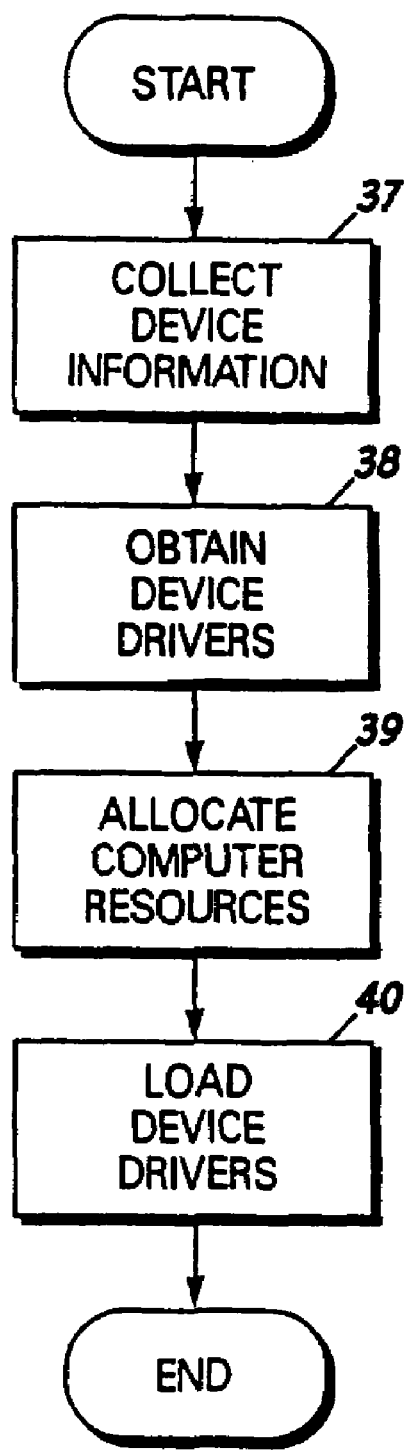
FIG. 2 is a flow chart diagram that illustrates the steps of a method for configuring the devices of a computer.

FIG. 2 generally shows the steps for a method for configuring the devices 20 for operation with the computer 8. Turning now to FIGS. 1 and 2, the computer-implemented process is started and device information is collected at step 37 for each of the devices 20. For each device 20, the device information includes identity data for uniquely identifying the corresponding device and resource allocation data for defining the resource requirements of the particular device. This device information is preferably associated with or otherwise linked with information for the corresponding system bus 18. The resulting product of this data collection process can be viewed as an "inventory" of the identities and resource requirements for devices 20 connected to the system bus 18.

For the devices that are designed to take advantage of the present inventive concept, at least a portion of the device information can be acquired by accessing the memory storage devices 29. However, certain system-level components and existing "legacy" boards containing devices 20 may not include a memory storage device 29 for storing such device-level information. In this event, the device-level information is preferably acquired from other sources, such as the BIOS program of the computer control system 21 or configuration files of the operating system 10. For the legacy devices, certain device-level information can also be acquired by examining the signature-like responses output by these devices in response to command signals supplied to the I/O ports 28.

A device driver is identified at step 38 for each of the devices 20 in response to the device information. At step 39, the resources 14, which are used by the devices 20 during computing operations, are allocated based upon the device information. As described in more detail below with respect to FIGS. 7-10, resource allocation is preferably an iterative routine that attempts to identify and resolve potential resource conflicts prior to an actual conflicting use of the resources 14 by the devices 20 during operation of the computer 8. In response to this allocation of the resources 14, the device driver for each of the devices is loaded at step 40 and the devices 20 are subsequently activated for operation with the computer 8, thereby terminating this configuration process.

Device information is preferably acquired for each of the devices 20, including all devices 20 supported by peripheral devices, add-on type adapter boards, system-level devices, and certain system busses. However, in the event that one of the devices 20 itself is implemented as a system bus, it may be necessary to complete the configuration tasks for the identified devices 20 connected to the system bus 18 prior to detecting any devices on the newly identified system bus. These tasks include identifying device drivers, allocating resources, and loading identified device drivers for the remaining devices 20 on the first system bus prior to identifying any of the devices connected to this newly identified second system bus.

For the computer 8, the steps shown in FIG. 2 are preferably conducted for the devices 20 on the integrated bus 15 and thereafter repeated to permit the identification of the additional devices connected to the interface bus 17'. This enables the devices 20 connected to the "parent" component represented by the ISA bus to be configured prior to the devices 20 on the "child" component of the PCMCIA bus. It will be understood that this type of configuration sequence is defined by the connection of second system bus (the PCMCIA bus) to a first system bus (the ISA bus).

In this manner, the devices 20 of the computer 8 are identified and associated with each of the system busses 18. In addition, the resources 14 are efficiently allocated based upon the device information, and the device drivers are assigned and loaded to enable the operations of the devices 20 with the computer 8. It will be understood that the proper configuration of the computer 8 is necessary for the devices 20 to use the resources 14 of the computer 8 and to communicate with the program modules running on the computer 8. Accordingly, the computer 8 is typically configured prior to using the devices 20 for the desired computing functions.

Although it is desirable to configure all of the devices 20 during the power-up or boot processes, particularly prior to completing the test and initialization routines of the computer control system 21, many resource conflicts cannot be fully resolved without complete knowledge of all resource requirements for the devices 20. Nevertheless, the preferred system supports the configuration process during the computer start-up sequence for a limited set of the devices 20, specifically those boot-level devices that are required to be active during the boot process. Thus, this pre-boot configuration process is completed for the "fixed" system-level devices on the computer's system board, which is also described as a motherboard. Likewise, the pre-boot configuration process is completed for the set of devices 20 that are connected to integrated expansion board, specifically the integrated bus 15, and are required for boot-level operations. The remaining devices 20, which also may require resource allocation, are preferably configured only after the computer 8 has completed the boot process.

Figure 3A:
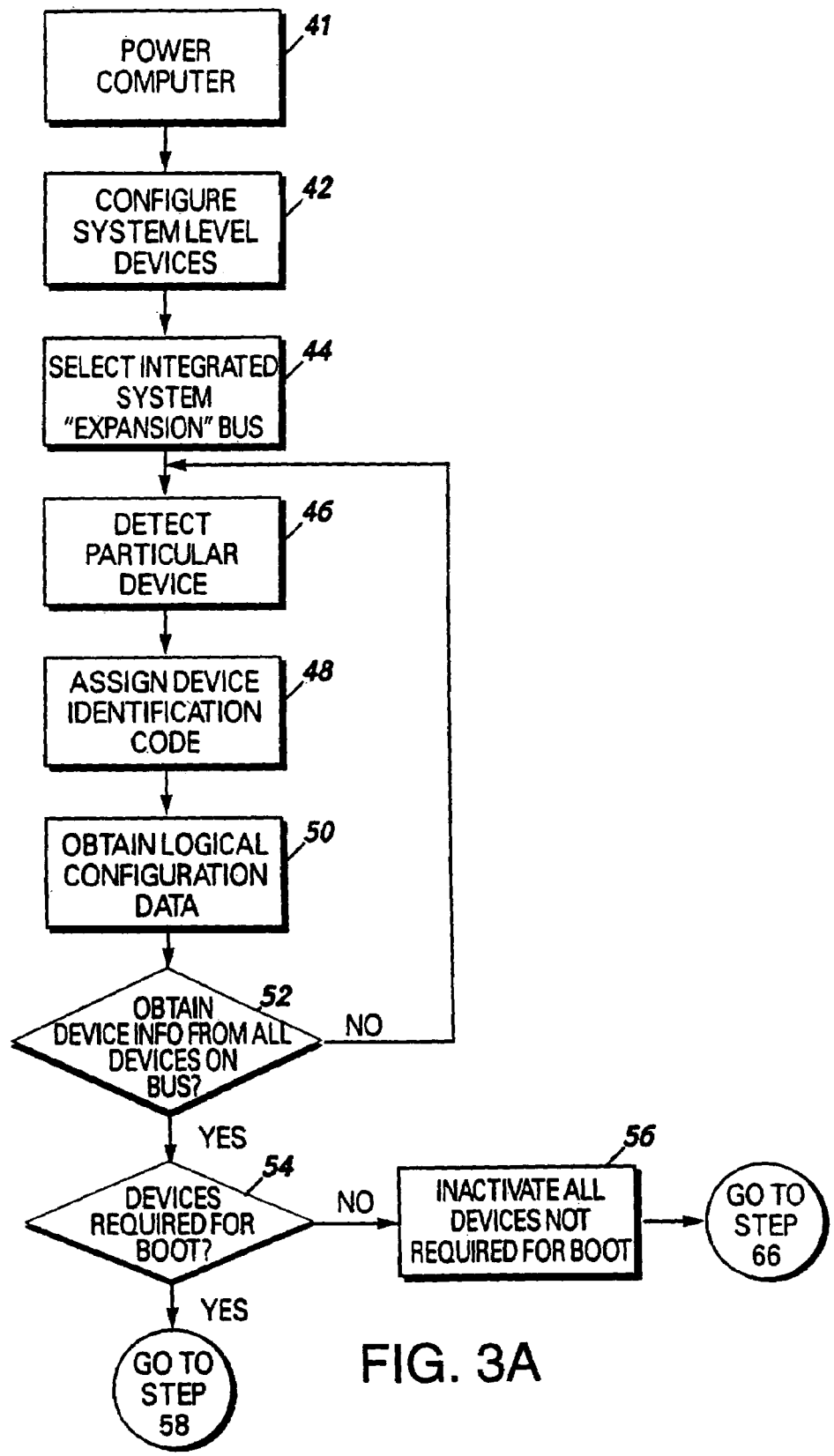
FIGS. 3A-C are flow chart diagrams that illustrate the preferred steps of a method for configuring the devices of a computer in accordance with the preferred embodiment of the present invention.
Figure 3B:
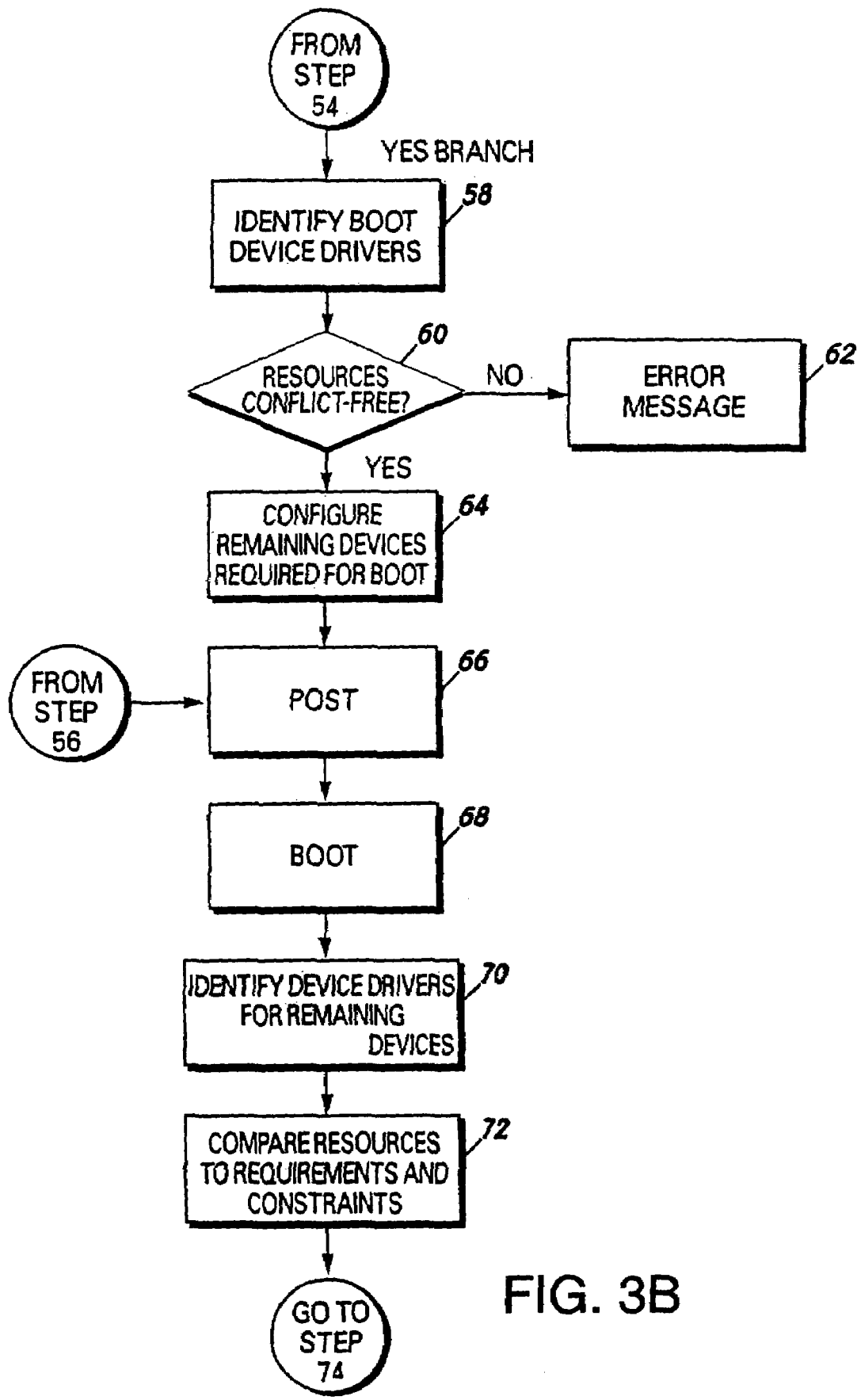
Figure 3C:
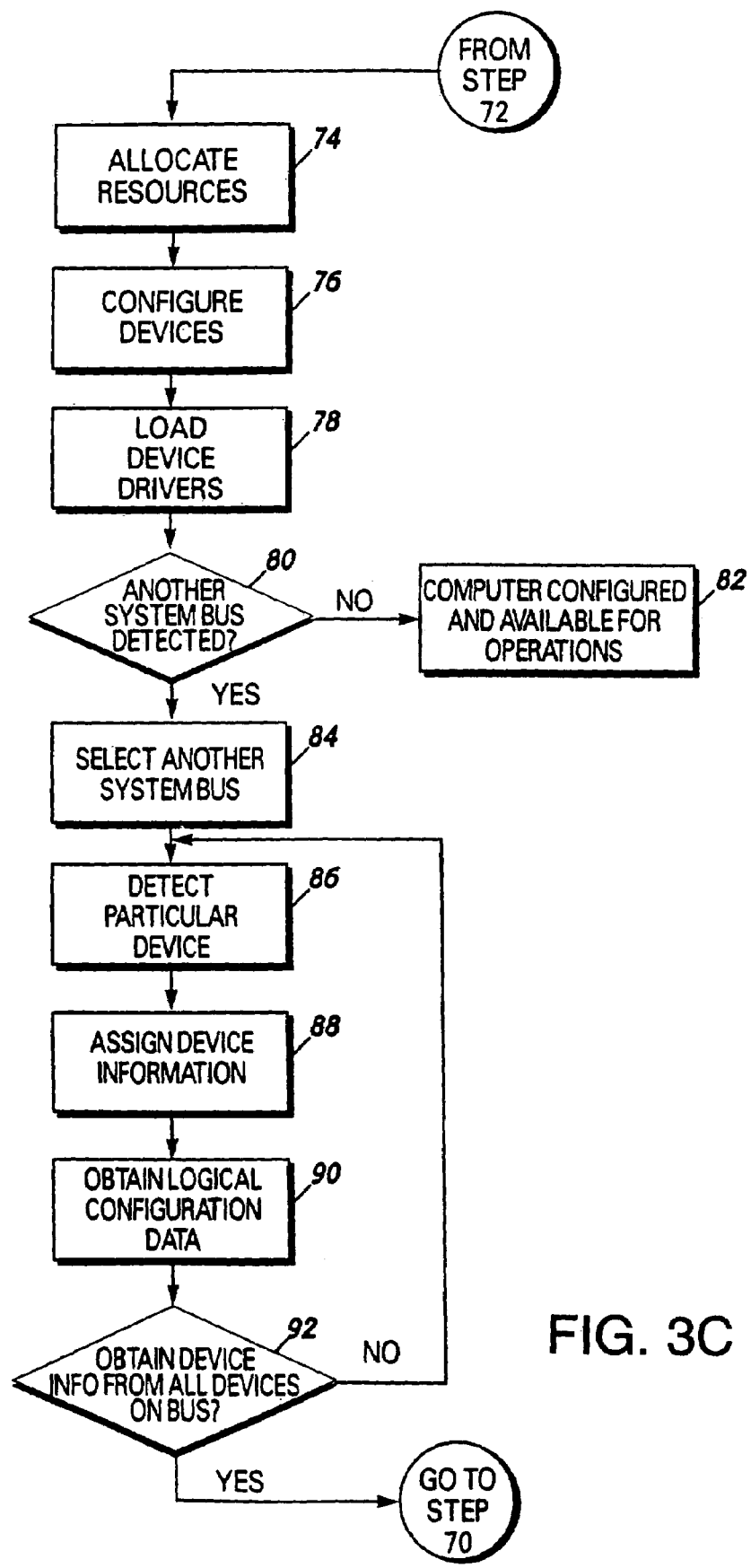

FIGS. 3A-C, collectively described as FIG. 3, are flow chart diagrams illustrating the preferred steps of a method for configuring the devices of a computer. Referring now to FIGS. 3A-C, which are collectively described herein as FIG. 3, and to FIG. 1, the configuration process is initiated in step 41 by powering-up the computer 8.

In step 42, certain devices known as system-level devices are configured in response to powering the computer 8. These system-level devices, which are configured based upon power-on default configuration settings, typically include I/O interfaces, the keyboard controller, the serial and parallel interfaces, the display controller, the system timer, the PIC, and the DMA controller. It will be appreciated that many of these components are mounted on the motherboard of a conventional personal computer. The system-level devices are preferably configured based upon default configuration parameters stored in the computer control system 21 or a memory device that can be accessed by the computer control system 21. The default configuration parameters for the system-level devices in the computer 8 are defined by the resource requirements and resource dependencies for such devices.

The preferred configuration process is based upon the collection of device-specific information from each of the devices 20 of the computer 8 to support the allocation of the resources 14 to those connected devices. Thus, still referring to FIGS. 1 and 3, the preferred configuration process continues for the devices 20 that are connected to the system-level expansion bus of the computer 8, specifically the integrated bus 15. In step 44, the integrated bus 15 is selected and an enumerator (not shown) is loaded for this. ISA bus. In subsequent steps, each of the devices 20 connected to the ISA bus of the computer 8 is examined to obtain device information.

In step 46, one of the devices 20 on the selected ISA bus is detected to enable the communication of device information from the detected device 20. For the ISA bus, the detected device is isolated from the remaining devices on the bus to permit interference-free communications with that device. Nevertheless, it will be appreciated that other types of system busses do not require isolation of the detected device to enable communications with that device. The preferred system for detecting the interface boards associated with the devices 20, isolating a particular interface board, and collecting device information is described in a related application, U.S. patent application Ser. No. 08/023,689, filed Feb. 25, 1993, entitled "System and Method for Computer Interface Board Identification," which is assigned to the assignee for this application and hereby incorporated by reference. The system described in the referenced application automatically determines which interface boards are connected to a computer bus and automatically assigns parameter selections to ensure proper operation of the boards within the computer.

At step 48, the detected device 20 is assigned a device identification code that preferably identifies the particular device as a certain device type connected to a selected bus, in this case, the integrated bus 15. The device identification code comprises an identification code and a system bus code. The identification code comprises a data string which uniquely defines the corresponding device. The identification code can include characters defined by the well known American Standard Code for Information Interchange (ASCII) or a combination of ASCII and non-ASCII data bytes. Similarly, the system bus code, which also can be implemented as a string of ASCII characters or a combination or ASCII and non-ASCII data, uniquely identifies a corresponding system bus. The identification code is typically supplied by the device 20, whereas the system bus code is associated with the system bus 18 and is generated externally to the device 20, i.e., typically by an enumerator associated with that bus. For example, a modem is preferably assigned an identification code that is different from the identification code for a printer, and different architecture expansion busses, such as ISA and MCA busses, are preassigned different system bus codes. Thus, the identification code defines the detected device and the system bus code defines the selected system bus that supplies the connection for the detected device. Examples of device identification codes, also described as device identifiers, include: "Root\*PNP0000\0", "ISAPNP\ADP1522_DEV0000\E8123123", and "BIOS\*PNP0100\0".

For the preferred embodiment, the identification code is used to identify the class or the type of the device 20. The vendor of the peripheral device associated with the device 20 typically defines the unique identification code for that device. Nevertheless, it will be appreciated that the identification code does not need to contain any information about the class or the type of the device 20. Indeed, the only requirement for the device identification code is that the data string formed by this combination of the system bus code and the identification code should be consistently used each time the computer 8 boots to uniquely identify the particular device 20 on the selected bus 18. The device identification code can include an instance number to distinguish the multiples instance of like devices within the computer 8.

The collection of device information continues at step 50. Specifically, logical configuration data is obtained for the detected device 20. The logical configuration data is preferably logically linked to the device identification code for the particular device 20. This device information is preferably stored in nonvolatile memory that is allocated for such use by the operating system 10. In addition, if the particular device 20 represents a newly installed device for the computer 8, then the device information is also stored within the computer database 16 to maintain an archival record of all of the devices 20 that have been installed for operation with the computer 8.

The logical configuration data defines the set of resources 14 necessary for operation of the particular device 20 with the computer 8. Specifically, the logical configuration data preferably comprises both resource requirement information and resource dependency information, which in combination define certain resource elements that are necessary for operation of the particular device 20. It will be appreciated that computer resources, such as the resources 14, include multiple resource options or elements, such as allocated memory ranges and a predefined set of interrupts, DMA channels, and I/O ports. The resource requirement information preferably defines a range of elements for each of the resources 14 required for the operation of the associated device. In contrast, the resource dependency information defines a particular combination of resource elements which are necessary for the operation of the particular device 20. For example, the resource dependency information for a modem may define a specific combination of an interrupt and an I/O port for the operation of that device.

Upon completing the collection of device information from the detected device 20, an inquiry is conducted at step 52 to determine whether device information has been obtained from all of the devices 20 on selected bus, in this case, the integrated bus 15. If the answer is negative, the "NO" branch is followed to the step 46 to continue the collection of device information from the remaining devices 20 on the integrated bus 15. In contrast, the "YES" branch is followed to the step 54 if device information has been acquired from all such devices 20. At this point, the device identity data and resource usage information have been obtained for each device 20 that either is a system-level device or is directly connected to the integrated bus 15.

In step 54, an inquiry is conducted to identify the subset of the devices 20 that must be active upon completion of the boot process. For the devices 20 that do not require a default-type configuration during the power-up sequence, the "NO" branch is followed to the step 56 and those devices preferably remain inactive during the power-up sequences. In contrast, the "YES" branch is followed from the step 54 to the step 58 for the devices 20 that must be activated during the boot process. Based upon this inventory of the identified devices 20 requiring activation during the boot process, a boot-level device driver for each of those devices is obtained in step 58 to enable communications between the boot-level devices and the computer 8. These boot-level devices typically include the system-level devices 20 on the system board of the computer 8 and certain adapter boards connected to the integrated bus 15, such as a display controller or a mass memory storage device controller, i.e., a fixed disk controller.

In step 60, an inquiry is conducted to determine if the resources 14 required by the set of identified devices 20 requiring enablement for the boot process are conflict-free. If so, the "YES" branch is followed to step 64. The resources required by these devices 20 are allocated during the step 64, and the required device drivers are subsequently loaded to permit boot-level operations. Alternatively, if the response to the inquiry in step 60 is negative, then the "NO" branch is followed to step 62, and the user is preferably supplied an error message based upon the detection of a resource conflict during the boot process. In response, the user may be required to power down the computer and to manually reconfigure the computer 8. However, it is not anticipated that a resource conflict for boot-level devices will be a common occurrence because the configurations for many of the boot-level devices mounted on the system board are typically predefined to be conflict-free by the computer vendor.

The above-described configuration steps 42-64 are preferably supported by software routines for the modified BIOS program of the computer control system 21. The modified BIOS program supports the identification of each of the boot-level devices, including system-level devices and the boot-level devices on the integrated bus 15, and stores device-related information within computer memory to support the configuration tasks for those devices. With the exception of the system-level devices, the configuration support supplied by the modified BIOS program concludes after the POST process is completed. Specifically, after POST, the control of the configuration process for all remaining devices 20 is preferably maintained by the operating system 10 rather than by the computer control system 21.

Upon completion of this portion of the configuration process, the conventional POST and BOOT routines are then conducted for the computer 8 during the steps 66 and 68, respectively. As a result of loading the operating system 10, selected configuration files of the operating system 10, such as CONFIG.SYS and the AUTOEXEC.BAT files, are processed by the computer 8. The CONFIG.SYS file is a system configuration file that contains parameters which determine how the computer will operate. The AUTOEXEC.BAT file supports user customization of computer operations, particularly the handling of application programs. The operations of both CONFIG.SYS and AUTOEXEC.BAT files for conventional operating systems are well known and will not be described herein.

Although FIG. 3 shows a specific sequence for the POST and BOOT routines, it will be understood that the configuration process can be adapted to operate with a different sequence of those routines. For example, at least a portion of the task operations of the POST routine can be completed after power-up and prior to the configuration of system-level devices in step 42.

Unlike the system board devices and the boot-level devices connected to the integrated bus 15, which are respectively configured during steps 42 and 64, the remaining devices 20 connected to the integrated bus 15 are configured only after the boot operations for the computer 8 have been completed. However, the configuration operations for the nonboot-level devices on the integrated bus 15 are supported by the collection of device information that occurred prior to the BOOT process of step 68. In particular, this configuration process is supported by the current inventory of both the system board devices and the set of devices 20 connected to the integrated bus 15.

At step 70, the device drivers for this set of nonboot-level devices are identified in response to the device information collected during the preboot operation. The device drivers are typically identified by accessing corresponding device-related information that is stored in the computer database 16 or by accessing a predefined file of the operating system 10.

The device information collected during the preboot operation further supports the allocation and the assignment of the resources 14 required by the nonboot-level devices on the integrated bus 15. In step 72, the resource requirements and dependencies for each of the nonboot-level devices 20 on the integrated system bus 15 are compared to the available resources 14. This comparison permits a determination of whether a potential resource conflict exists. In an iterative fashion, potential resource conflicts are arbitrated and resolved prior to resource allocation. In step 74, the resources 14 are allocated to the nonboot-level devices 20 based upon the arbitration results of the step 72 and those devices are configured in step 76. In view of the allocated resources, the identified device drivers are loaded in step 78 and the devices are enabled for operation with the computer 8. This arbitration process is described in more detail below with respect to FIGS. 7-10.

For the system board devices and the set of devices directly connected to the integrated bus 15, device information has now been collected and stored in volatile computer memory and, as required for newly installed devices, in the nonvolatile memory of the computer database 16. The device information for the devices 20 on the integrated bus 15 may identify one or more of the devices as another system bus 18 capable of supporting other connected devices 20. Device information has not yet been collected for the "children" devices of each system bus 18 connected to the integrated bus 15. Nevertheless, for the preferred embodiment, the tasks of identifying device drivers, arbitrating and allocating the resources 14, and loading the identified device drivers for the set of nonboot-level devices 20 on the integrated bus 15 enable the subsequent collection of device information from these children devices. Thus, at step 80, an inquiry is conducted to determine whether any of the devices 20 on the selected bus are operable as system busses. If not, the "NO" branch is followed to step 82, and the automated configuration operation for the computer 8 is completed. In contrast, if another system bus is connected to the computer 8, then the "YES" branch is followed to step 84 to continue the data collection process.

Referring still to FIGS. 1 and 3, in step 84, another one of the system busses 18 is selected to support the configuration of the set of the devices 20 connected to that selected bus. For the illustrative example of FIG. 1, the interface bus 17' is selected, and the enumerator for that bus is loaded. One of the devices 20 on the interface bus 17' is subsequently detected in step 86. At step 88, the detected device 20 is assigned a device identification code comprising the identification code for the detected device and the system bus code for the interface bus 17'. Likewise, logical configuration data is obtained for the detected device 20 during the step 90 to define the resources 14 necessary for operation of the device.

Upon completing collection of device information from the detected device 20, an inquiry is conducted at step 92 to determine whether device information has been obtained from all of the devices connected to the interface bus 17'. If the answer is negative, the "NO" branch is followed to the step 86 to continue the collection of device information from those remaining devices 20. In contrast, the "YES" branch is followed to the step 70 to enable the sequence of identifying device drivers, arbitrating and allocating the resources 14, and loading the identified device drivers for the detected devices 20 of the interface bus 17'. This process will be repeated until all of the system busses 18 within the computer 8 are detected.

It will be understood that the device information collection process has now been completed for the existing devices 20 of the computer 8. Specifically, the device identification code and the logical configuration information have been collected from each of the devices 20. This device information is preferably stored in the computer memory 22 to support any additional configuration operations that are necessitated by another asynchronous event affecting the operating state of the computer 8.

It will be appreciated that prior art personal computers generally do not include a modified BIOS program to implement the specific sequence defined by the steps 42 through steps 64 for the configuration process shown in FIG. 3. Accordingly, for computers with a conventional BIOS program, the system board devices are configured by the BIOS program and the initialization processes performed by the POST and BOOT routines are conducted in a known manner in response to powering the computer. After the completion of the boot sequences, an embodiment of the present invention supports the automated configuration of the remaining devices connected to this computer.

Specifically, upon booting the prior art computer, this postboot configuration process starts at step 84 by selecting one of the system busses 18. However, unlike the previously-described configuration operation, the integrated bus 15 is selected only after the completion of the BOOT routine. In this manner, the sequence of tasks starting at step 84 of FIG. 3 are completed to identify and characterize the existing devices 20 of the computer 8, to identify the associated device drivers, to allocate the resources 14, and to load the device drivers.

Automated Configuration System Components

Figure 4:
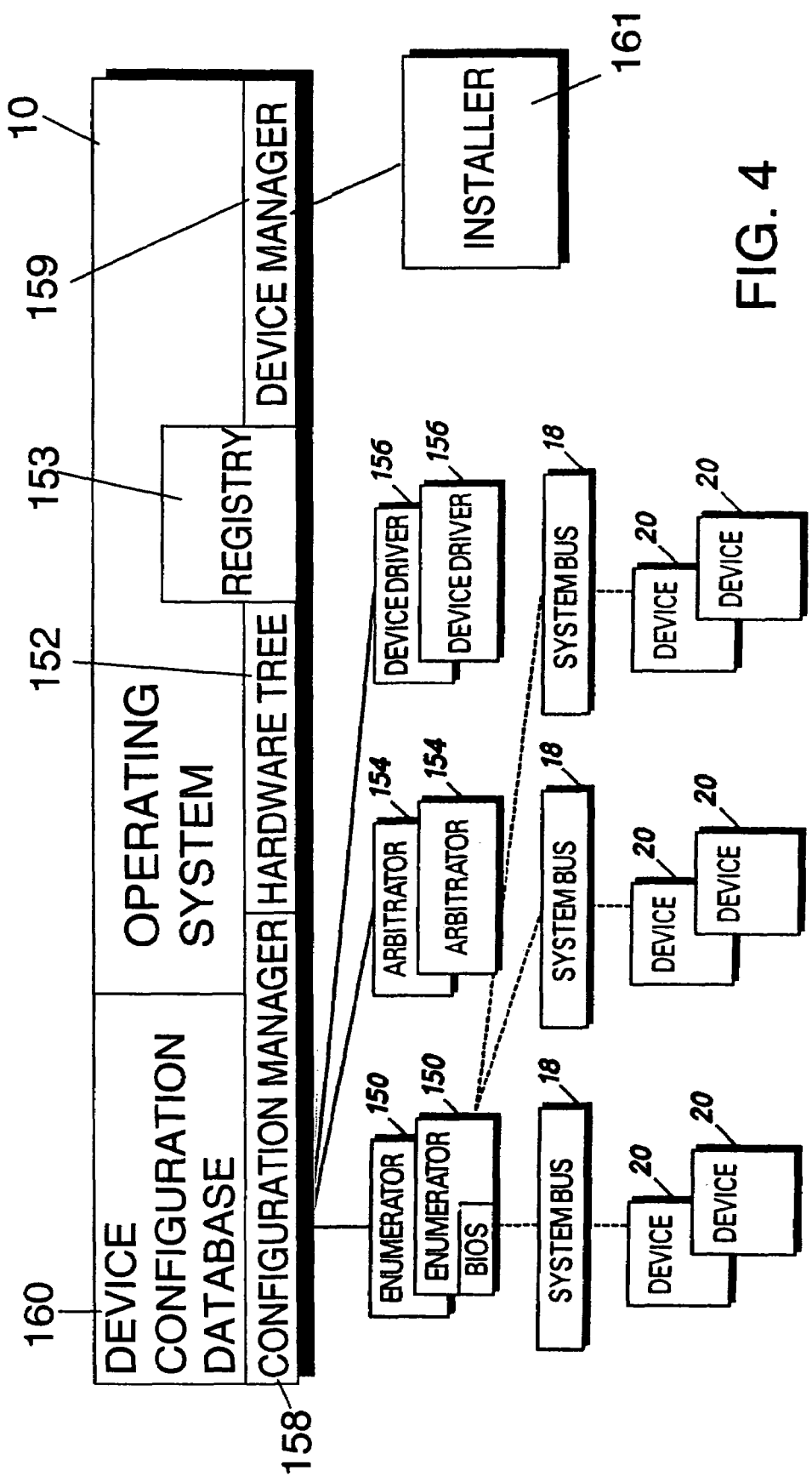
FIG. 4 is a block diagram that illustrates the components of the operating system of the present invention.

FIG. 4 is a block diagram that illustrates the components and their structural communications links for the preferred embodiment of the operating system 10. Referring to FIGS. 1 and 4, the operating system 10 comprises numerous software programs or modules, including enumerators 150, a hardware tree 152, a registry 153, arbitrators 154, device drivers 156, a configuration manager 158, a device manager 159, a device configuration database 160, and device and class installers 161*a* and *b*. The enumerators 150, the registry 153, the arbitrators 154, and the device drivers 156 are associated with the configuration manager 158. The device manager 159 works in conjunction with the configuration manager 158 to install devices 20 and is associated with the device and class installers 161*a* and *b*. It will be understood that the operating system 10 also preferably interacts with a modified BIOS program of the computer control system 21, i.e., a BIOS program modified to support operations of the present invention and various hardware components of the computer 8, including the system busses 18 and the devices 20, to support the configuration system.

Figure 5B:
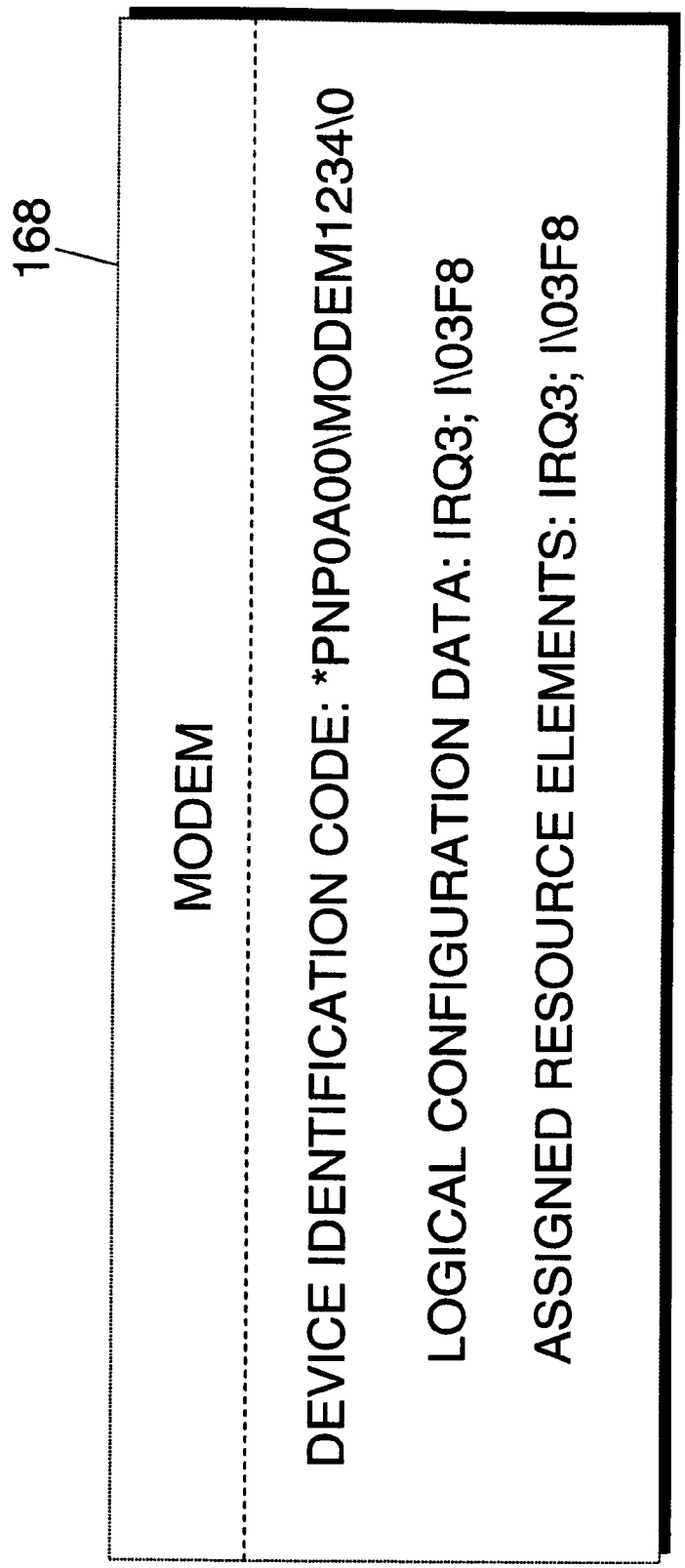
Figure 6:
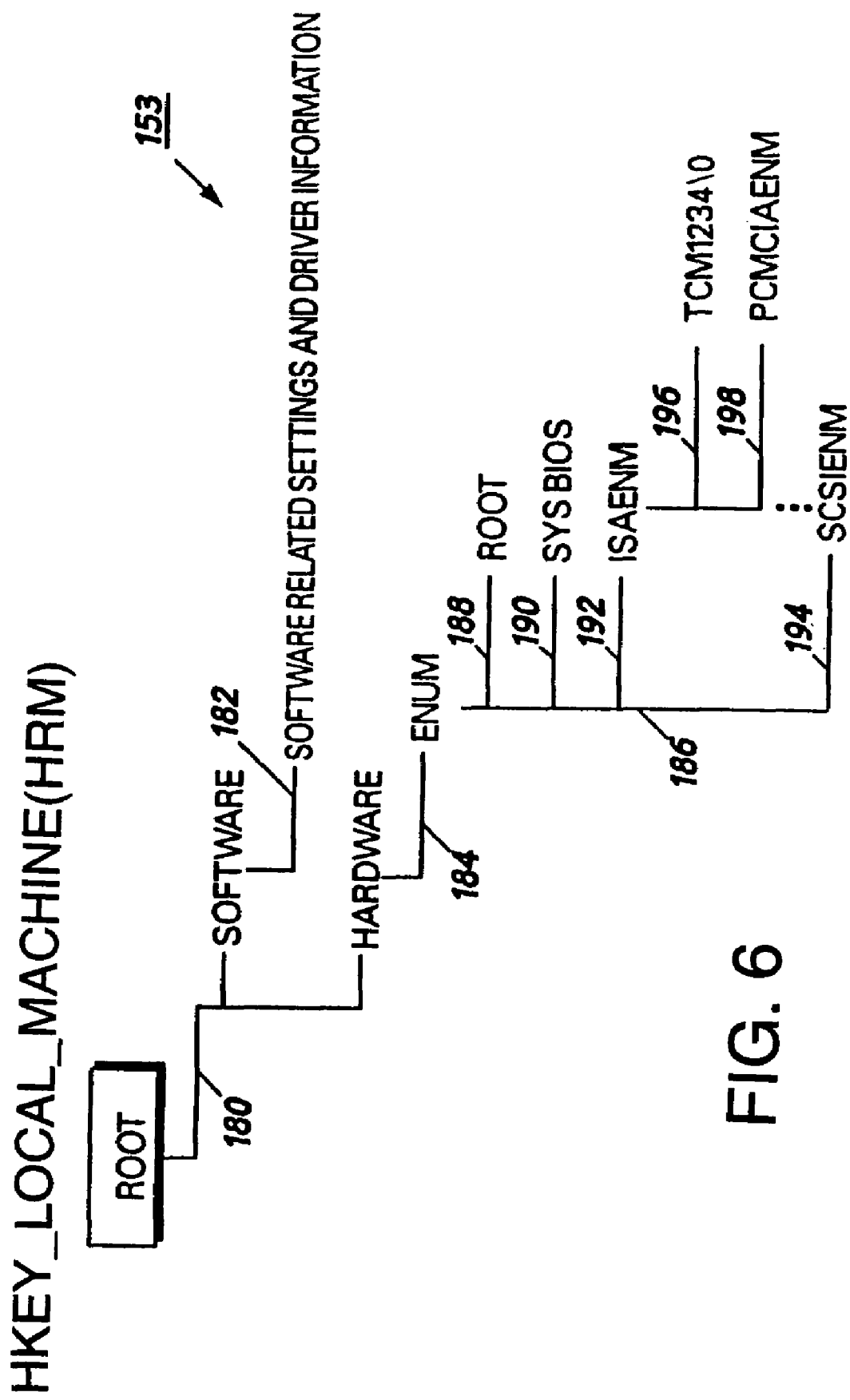
FIG. 6 is a diagram that illustrates one of the components of the operating system shown in FIG. 4, specifically a registry for storing archival device-related information for the computer.

These components are generally described within sections headed by their respective identifying legends and are best shown in FIGS. 4-6.

Enumerators

The enumerators 150 "enumerate" or operate to report the identities of detected devices 20 on the system busses 18 in response to certain events that affect the operating state of the computer 8. These events include changes to the state of power supplied to the computer 8, including the states Power-on, Standby, Suspend, or Resume. The events also include the insertion of a device onto or the removal of a device from a system bus, or the insertion into or the removal of a computer from a docking station or an expansion chassis. It will be appreciated that this connection (or removal) of a device 20 to the computer 8 can be completed by a physical connection or as a logical connection via a wireless communication link or a network In addition, for certain devices 20, the enumerators 150 also can transmit assigned resource elements from the configuration manager 158 for use by the devices 20 in response to an allocation of the resources 14.

Each enumerator 150 is assigned to a component of the computer 8 that is capable of having children, namely, those components that provide a connection for yet another hardware component. It will be understood that computer busses, such as the system busses 18, represent a common mechanism for connecting adapter boards and peripheral devices to a personal computer. For a typical personal computer, the enumerators 150 can be assigned to computer busses, the modified BIOS program that supports the configuration of boot-level devices, and certain ports, such as serial and parallel ports.

For each system bus 18, the associated enumerator 150 is programmed to recognize the operating characteristics of its assigned computer bus and to support the configuration of the devices 20 connected to that computer bus. Specifically, these enumerators obtain device-related information from the devices 20 and subsequently store such information within a central memory location of the hardware tree 152. As outlined above, this collection of device information is initiated in response to the events affecting the enumerator's assigned system bus 18, such as the insertion or removal of a device or a change in the power state of the computer 8. It will be understood that this collection of device information from the devices 20 in the computer 8 is described as an enumeration process.

Likewise, for the computer control program 21, an enumerator 150 can be programmed to recognize the system-level devices of the computer 8 and to support the configuration of those system-level devices. The enumerator 150, assigned to the modified BIOS program, accesses the default-type configuration parameters for the system-level devices from the modified BIOS program. This operation is conducted in response to events affecting the computer's operating state, including the power-on event, and stores this information within the hardware tree 152. Furthermore, the enumerator 150 for the modified BIOS program can be programmed to detect the insertion of the computer into or the removal of the computer from a docking station and outputs an indication of these events to the configuration manager 158.

A unique, system bus code is associated with each of the enumerators 150. For example, the ISA bus enumerator has a particular system bus code that is different from the system bus code assigned to the MCA bus enumerator. An enumerator 150 creates a device identification code for each device 20 connected to the assigned system bus 18 by appending its system bus code to the identification code for the device 20. The device identification code also can include an instance number that is assigned by the enumerator 150 to distinguish identical devices 20 connected to the same system bus 18.

An instance number can be obtained by the enumerator 150 from the device 20 itself, if available, or can be assigned to the device 20. By way of example, for the ISA bus, the ISA bus enumerator assigns an instance number to a logical device based upon a serial number that is stored in the memory storage device 29 associated with that device. If no serial number is available for the device 20, then the enumerator 150 is required to use some other unique attribute to generate an uniquely addressable instance number. For the PCMCIA bus, an alternative scheme for assigning an instance number is based upon the use of the slot number for the bus socket connected to the device 20.

The enumerator 150 also obtains logical configuration data for each of the devices 20 of the computer 8. Logical configuration data is preferably linked to other corresponding device information to maintain a logical link with the represented device 20. For a typical device, the device identification code and the logical configuration data, which are collectively referred to as device information, are preferably stored within a device node associated with that device. Each device node is preferably maintained in the tree-like memory structure of the hardware tree 152, as described below.

As a result of the resource assignment process, the enumerators 150 can receive data packets containing assigned resource elements for the devices 20. In response to receiving an assignment of the resources 14 for a particular device, the enumerator 150 accesses the appropriate device node to store the resource assignment. In this manner, the assigned resource information is maintained in a central memory location that is accessible by the device and, as required, by the device driver corresponding to that device.

The enumerators 150 provide an abstraction layer that effectively separates the controller portion of the operating system 10, the configuration manager 158, from the underlying bus structures of the computer 8. By placing the system bus-level information within the driver-like enumerators 150, the operating system 10 can be adapted to operate with a variety of present and future computer bus architectures. Thus, unlike conventional operating systems, the configuration manager 158 can communicate with a variety of system busses without any knowledge of the characteristics of those system busses because such information is supplied by the abstraction layer of the enumerators 150.

For the preferred embodiment, the operating system 10 can include a variety of specific enumerators 150, including the root enumerator, BIOS enumerator, ISA bus enumerator, PCI bus enumerator, PCMCIA bus enumerator, EISA bus enumerator, COM enumerator, and LPT enumerator. The configuration manager 158 includes the root enumerator, which does not operate to detect devices on a system bus, but rather relies on the registry 153 to determine whether a device 20 exists within the computer 8. If there is an entry in the registry 153, the root enumerator assumes that it exists and the appropriate drivers are loaded. This is the method by which legacy devices are supported because it is sometimes difficult to determine with complete accuracy and safety that a prior art ISA bus-compatible adapter card is installed.

The BIOS enumerator is responsible for identifying the devices 20 on the motherboard of the computer 8. The ISA bus enumerator detects Plug and Play-compatible devices connected to the ISA bus in the computer 8. The PCI bus enumerator uses the PCI BIOS and the PCI device configuration space to detect and configure devices 20 connected to the PCI bus. The PCMCIA bus enumerator uses a Socket Services driver to determine whether a PCMCIA cards is inserted in each socket of the PCMCIA bus, and for those which are present, the tuple space of the PCMCIA-compatible card is read to identify which card is inserted and what resources are required. The EISA bus enumerator identifies the EISA-compatible devices that are installed within the computer 8 and determines the resources 14 required by these devices. The COM enumerator identifies compliant devices attached to a serial port of the computer 8. The LPT enumerator identifies compliant devices attached to P1284-capable parallel ports.

Hardware Tree

The hardware tree 152 supplies a hierarchical representation of the device identities and resource element requirement, including resource usage requirements and the resource assignments, for the present devices 20 operating with the computer 8. The data structure for the hardware tree 152 is maintained in a hierarchical arrangement of device nodes within an allocated portion of the nonvolatile memory supplied by the computer memory 22. This stored information can be accessed by the operating system 10, specifically the configuration manager 158, by device drivers, or by application programs (via a common interrupt).

Each device node in the hardware tree 152 represents one of the devices 20 presently installed for operation with the computer 8 and generally contains three main attributes that describe the capabilities and resource requirements for that device. A device node, which is also described as a devnode, is a specific entry in the hardware tree 152. Each device node can contain a unique device identifier, i.e., the device identification code, and a list of resource requirements. The device identifier is a string which uniquely describes the device 20 represented by the device node. The string typically identifies the component that found the device. Because this device identifier is also used as a key in the registry, it must be unique within the system so that information about the represented device 20 can be reliably retrieved.

A requirements list of a device node can include logical configuration data which identifies the possible types of resources 14 that the associated device 20 needs to successfully operate within the computer 8 and any constraints associated with those resources 14. Constraints are often resource interdependencies, such as a device requiring that it must use the IRQ3 and the I/O port 02F8 in combination in order to operate successfully. Thus, the requirements list supplies resource element requirements for a device.

The device node also can include a currently assigned resource configuration, status information, a device driver entry point, an enumerator entry point, and arbitrator entry point(s). The currently assigned resource configuration data represents allocated resource elements. The status information represents the state of a device 20, such as whether it is disabled or configured. When a device driver 156 is loaded for a specific device node, the device driver 156 preferably passes an entry point that can be called to assign or change hardware configurations.

Upon the completion of data storage, the device node typically will include the device identification code, the logical configuration data, and the assigned resource elements. The device identification code is useful for accessing the hardware tree 152 and maps into a unique entry key for the archival data structure of the registry 153. It will be appreciated that the device information for each device 20 is stored within a corresponding device node to enable all information pertaining to a common device to be maintained in a central storage location with the hardware tree 152.

The device information collected from the devices 20 by the enumerators 150 is used to populate the device nodes of the hardware tree 152. However, those skilled in the art will appreciate that certain existing interface boards or peripheral devices do not include a mechanism for storing configuration data. Upon identifying these "legacy" devices, at least a part of the hardware tree 152 can be populated when the configuration manager 158 copies information for those devices to the hardware tree 152 from an available information source, such as text-based information files stored on a mass memory storage device of the computer 8.

Because the hardware tree 152 reflects the identities, resource element requirements, and current resource element allocations for the existing devices 20, the data stored within the hardware tree 152 can change each time the computer 8 boots with a new hardware configuration or in response either to adding a new device or to removing an existing device. Likewise, the insertion into or withdrawal of the computer 8 from a docking station can modify the data stored by the hardware tree 152. Accordingly, it will be appreciated that the hardware tree 152 is a computer database containing device information which reflects a snapshot of the characteristics for the devices presently installed for operation with the computer 8.

A user can access the device configuration information in the hardware tree 152 to verify the present configuration of its computer. Access to this useful information can be achieved by either local or remote communications means, such as directly from the computer itself or via a network.

In view of the foregoing, it will be understood that the hardware tree 152 is a type of data structure, in memory, which is built and maintained by the configuration manager 158. The hardware tree 152 contains configuration information for all presently installed devices 20 in the computer 8. This allows the configuration manager 158 to access this data structure to keep track of the resources associated with each device 20, such as IRQs, I/O ports, and even non-sharable resources like SCSI identifiers.

The creation of a device node within the hardware tree 152 leads to the loading of an appropriate device driver 156. Although a device driver 156 or other component cannot access the hardware tree 152 or its device nodes directly, these components can retrieve a handle to any device node and carry out tasks that retrieve and set information in the device node. By examining the assigned resource elements within a device node, a device driver 156 can determine which resources 14 have been allocated for the represented device 20.

Referring to FIG. 5A, which illustrates the tree-like data structure of the hardware tree 152 for the computer 8 shown in FIG. 1, the hardware tree 152 contains a set of device nodes, including a device node 162 for the local bus, a device node 164 for the ISA bus, a device node 166 for the network card, a device node 168 for the modem card, a device node 170 for the SCSI bus, and a device node 171 for the PCMCIA bus.

A branch between any pair of the device nodes of the hardware tree 152 indicates that the connected device nodes share a common link. For example, upon entering the hardware tree 152, the device node 164 for the ISA bus can be reached only by first passing through the local bus device node 162 and a branch 172. This defines an interconnection between those system busses 18 (FIG. 1), thereby supplying an indication that the ISA bus is connected to the local bus. Likewise, both the network card and the modem card are connected to the ISA bus because branches 174 and 176 respectively extend from the device node 164 to the device nodes 166 and 168. In similar fashion, a branch 178 extending between the device nodes 164 and 171 indicates that the PCMCIA bus is connected to the ISA bus, and a branch 179 extending between the device nodes 162 and 170 indicates that the SCSI bus is connected to the local bus.

FIG. 5B illustrates the data structure for a representative device node of the hardware tree 152, in this case, the device node 168 for the modem card. Referring to FIGS. 5A and 5B, collectively described as FIG. 5, upon completion of the configuration of the modem card, the device node 168 preferably includes the device identification code, logical configuration data, and assigned resource elements. For the modem card, the device identification code is "*PNP0A00\Modem1234\0". A review of this device identification code indicates that the modem card is connected to the ISA bus, which is represented by the system bus code "*PNP0A00". In addition, the modem card is assigned an identification code "Modem1234\0" and is the first identified modem card of its type on the ISA base as evidenced by the instance number "0". The logical configuration data includes a specified combination of resource elements required for operation of the modem, in this case, the interrupt IRQ3 and the I/O port I/O3F8. This is followed by the assigned resource elements, which, for this example, include this same resource combination of the interrupt IRQ3 and the I/O port I/O3F8.

It will be appreciated that the above description of the attributes for the device node 168 is supplied as a representative example of the information that can be stored within a device node of the hardware tree 152. However, it will be understood that the data stored within the device nodes of the hardware tree 152 can be different because each device node contains data describing the identification and resource requirements for the represented device.

Registry

Returning now to FIG. 4, the registry 153 is a hierarchical, tree-structured database for storing various software and hardware parameters, including device information. The registry 153 is initially stored within the nonvolatile memory of the computer database 16 upon installing the operating system 10 for use on the computer 8. The registry 153 preferably contains hardware archival data, which is a superset of the memory-resident hardware tree 152, and software archival data containing software-related parameters and software driver information. The preferred operating system 10 can use the registry 153 to store information about which drivers should be loaded when a particular device is enumerated, as well as such information as the driver revision number, manufacturer, and potential logical configurations of the device.

In contrast to the hardware tree 152, which contains device information for currently detected devices 20, the registry 153 contains a complete listing of any and all hardware components that have been installed on the computer 8. In this manner, even if a particular device 20 is removed for one session and then available again for the next session, the user will not be required to set-up the device again for the next session because all necessary device information is contained in the registry 153. Thus, if a particular device 20 is removed from the computer 8, the device information for that device 20 remains in archival storage within the registry 153.

Turning now to the preferred tree-like data structure of the registry 153, the operating system 10 stores information about devices and device drivers in the branches of the "HKEY_LOCAL_MACHINE" (HLM) key. Initially, the operating system 10 creates registry entries during system setup in response to detecting or enumerating a device 20. A setup utility also can copy information about the given device or a compatible device from a matching .INF "device information" file to the registry 153. The .INF file provides the instructions needed to add resource requirements, driver-specific data, and switch settings to the appropriate branches of the registry 153. Other representative branches of the preferred data structure for the registry 153 are described below.

A "HLM\HARDWARE" branch stores information about the devices 20 and system components.

A "HLM\SOFTWARE" branch stores information about application programs and system components. Information for an application program is preferably stored information under its own subkey in the registry 153. The subkey preferably has the general form SOFTWARE\manufacturer\product\version.

A "HLM\ENUM" branch contains information about the devices 20 that are presently and were previously installed in the computer 8. The operating system 10 uses this branch during system startup to retrieve information about the enumerated devices 20. If the system cannot find information about a device 20 in this branch, it assumes that new hardware has been installed and automatically invokes a device installer routine, such as the installer 161, that creates the necessary entries and installs the device drivers 156. Information remains in this branch, even if the corresponding device is removed, so that the necessary information is present if the device is reinstalled.

The system-wide database of the registry 153 stores a hierarchical tree of "keys" and "values" in a tree-like data structure. The following keys identify branches of the "HKEY_LOCAL_MACHINE" key or "ROOT" key that contain device-related information within the registry 153:

ENUM

Contains information for the legacy devices, the devices adapted for use with the present invention, and the user-installed devices. Initially, this branch receives subkeys and values during system setup.

ENUM\enumerator

Contains a permanent record of all hardware components that have been installed or are presently installed within the computer 8. This information typically includes the list of the devices 20, their resource requirements, and device driver bindings. The enumerator subkey uniquely identifies an enumerator; there is preferably one subkey for each enumerator 150 of the operating system 10.

ENUM\ROOT

Contains information for all detected legacy devices. The "root" enumerator uses this information to load the device drivers 156 for these components. If ENUM\ROOT identifies a legacy device, the operating system 10 preferably loads the corresponding device driver 156.

ENUM\enumerator\device-id\instance

Contains device-specific information. The enumerator uniquely identifies the enumerator 150 associated with the particular device 20. The device-id is the device identifier for this device, and instance is a string that uniquely identifies a particular instance of the device. This branch contains values such as "DeviceDesc", "Class", "CompatibleIDs", and "Driver". The "DeviceDesc" value identifies the localized name of a particular device 20. The "Class" value identifies the name of the device class. The "CompatibleIDs" value identifies a list of identification codes for compatible devices. The "Driver" value identifies the branch that contains information about the device driver 156 for a corresponding device or routine.

ENULM\ROOT\device-id\device-number

Contains information for a specific legacy device. The device-id is the device identifier for a particular device 20 and device-number is preferably a 4-digit, hexadecimal number that uniquely identifies an instance of that device. This branch contains values such as "DeviceDesc", "Class", "CompatibleIDs", "BootConfig", and "Driver". The "DeviceDesc" value identifies the localized name of a particular device 20. The "Class" value identifies the name of the device class. The "CompatibleIDs" value identifies a list of identification codes for compatible devices. The "BootConfig" value identifies the boot configuration for a particular device 20. The "Driver" value identifies the branch that contains information about the device driver 156 for a corresponding device or routine.

ENUM\ROOT\device-id\device-number\LogConfig

Contains logical configuration information for a legacy device. The device-id is the device identifier for the device 20 and device-number is preferably a 4-digit, hexadecimal number that uniquely identifies an instance of that device.

FIG. 6 shows a simplified example of the tree-like data structure for the registry 153 to facilitate a review of this component of the operating system. Referring to FIGS. 4 and 6, a ROOT key 180, also described as the "HKEY_LOCAL_MACHINE" or "HLM" key, includes two branches, the software archive 182, which contains software archival data, and the hardware archive 184 containing hardware archival data. The software archive 182 contains information related to location and identity of various program files, including the device drivers 156. The hardware archive 184 can contain hardware-related information, including the identity of detected devices; any user-defined configuration; the "last working configuration"; and information concerning the loading of device drivers. The information maintained by the software archive 182 and the hardware archive 184 is organized into logical classes, and additional branches extending from the archive branches are associated with the classes or categories of this information.

Focusing on the hardware archive 184 in FIG. 6, an ENUM branch 186, which represents the enumerators 150 for the operating system 10, extends from the hardware archive 184. Under the ENUM branch 186, each enumerator 150 is assigned its own branch, with one "child" device or device branch extending from the enumerator branch for each device it has ever enumerated and set-up. In addition, one enumerator branch, the "ENUM\ROOT" branch 188, contains entries for legacy devices, i.e. hardware for which there is no enumerator 150. Most of the information for legacy devices is provided either by the .INF device information file that is provided with the legacy device or directly by the device's setup module.

The ENUM branch 186 includes the enumerator branches 188, 190, 192, and 194, which define the respective enumerators 150 for the root, the modified BIOS program (SysBIOS), the ISA bus (ISAENM), and the SCSI bus (SCSIENM). It will be understood that the device identification codes, which are assigned by each enumerator 150 to the detected devices 20, operate as a key to the corresponding entries in the hardware archive 184 of the registry 153.

The registry 153 also contains device branches for each of the devices 20 that have been installed during both past and present operations of the computer 8. These tree-like device branches, which can extend from each of the enumerator branches, such as the branches 188, 190, 192, and 194, represent the past and present devices of the computer 8. The device branches preferably contain pertinent device-related data, including an identification code, logical configuration data, and a pointer to the device driver for that device. Accordingly, the device branches, such as the branches 196 and 198, represent the archival device-related information for devices that have operated in the past or at present with the computer 8 and can extend from each of the enumerator branches 188, 190, 192, 194.

The root branch 188, which extends from the ENUM branch 186, can include device branches representing device-related information for existing devices 20 that lack a mechanism for storing the identification code and the resource usage data. These devices, which are typically referred to as legacy or static devices, can be represented by branches extending from the root branch 188. In similar fashion, the SysBIOS branch 190, otherwise referred to as the system BIOS branch, also extends from the ENUM branch 186 and can include device branches representing the system-level devices located on the motherboard of the computer 8. In addition, the SCSI branch 194, which extends from the ENUM branch 186, can include device branches representing device-related information for SCSI bus-compatible devices. Although it will be recognized that a personal computer is operable with system-level devices and one or more legacy devices and/or SCSI-compatible devices, device branches for these types of the devices 20 are not shown in FIG. 6 to simplify the illustration of the registry 153.

Figure 8:
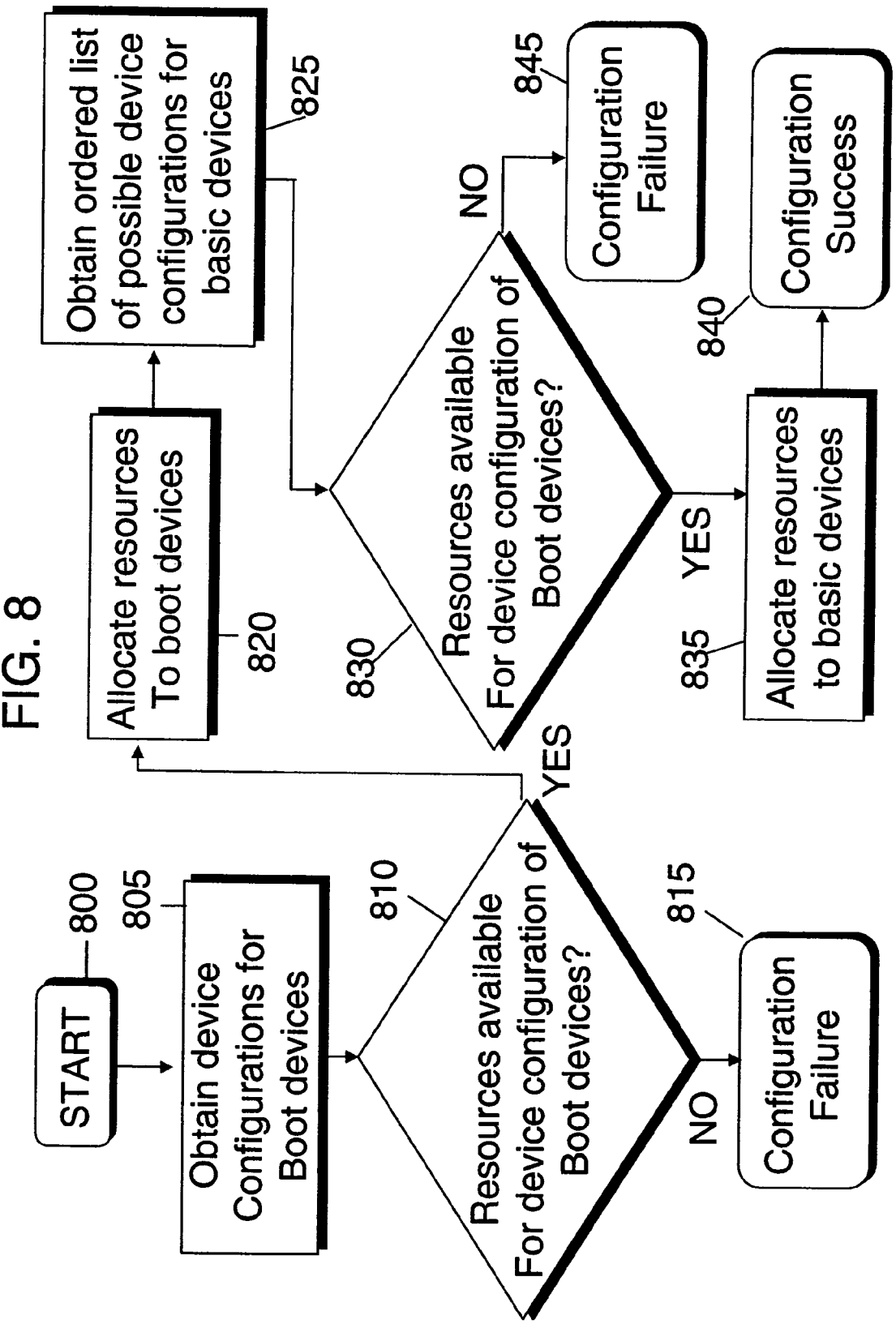
FIG. 8 is a logical flow diagram that illustrates the steps of a method for allocating resources to the devices of a computer in accordance with the present invention.

Device branches 196 and 198, which extend from the ISAENM branch 192, are examples of typical device branches and represent the devices 20 that have been or are at present connected to the ISA bus. It will be appreciated that the device branches 196 and 198 represent typical devices connected to the ISA bus in the computer 8 and are shown in FIG. 8 as examples of the device branch concept for the registry 153.

The Modem1234\0 branch 196, which extends from the ISA bus branch 192, indicates that a single device, in this case, the modem card having the identification code "Modem1234\0", is (or has been) connected to one of the system busses 18 (FIG. 1), namely the ISA bus. In general, the identification code can represent the manufacturer's identity, the model of the corresponding device, and the instance number. For this example, the manufacturer is "Modem", the model is "1234", and the instance number is "0".

The PCMCIAENM branch 198 extending from the ISA bus branch 192 indicates that another device 20 having the device identification code PCMCIAENM is (or has been) connected to the ISA bus. This device identification code indicates that the detected device 20 is actually another bus, specifically the PCMCIA bus, which is capable of supporting the connections of additional devices 20. Thus, the branch 198 also represents an enumerator branch because an enumerator 150 is assigned for the enumeration of any of the devices 20 connected to the PCMCIA bus. If the PCMCIA bus represented by this device branch is the parent for "children" devices, then the PCMCIAENM branch 198 can include device branches representing such devices on the PCMCIA bus.

Arbitrators

Returning again to FIGS. 1 and 4, it will be seen that each of the arbitrators 154 is assigned to a particular resource 14. Arbitrators 154 operate to determine the assignments for the elements of their respective resources 14 in view of the resource element requirements for the devices 20 connected to the computer 8. The arbitrators 154 are programmed to recognize the characteristics of their assigned resources 14, including the specific elements of the corresponding resources. In addition, the arbitrators 154 preferably maintain a table or list of reserved resource elements to insure compatibility with the fixed designs of existing computer components. Reserved resource elements are generally maintained for use by certain devices 20 that are known to require the use of such resource elements.

In response to a list of possible device configurations for the detected devices 20, each arbitrator 154 operates to attempt to allocate its respective resource elements to the various devices 20 that require use of such resources during computer operations. For the computer 8, the arbitrators 154 are assigned to handle access to the message addresses for the memory 22, the interrupts 24, the DMA channels 26, and the I/O ports 28. The arbitrators 154 are implemented as individual components separate from the remaining portion of the operating system 10 to allow the extension of the preferred operating system to other possible resources of a personal computer.

The arbitrators 154 work in tandem with the configuration manager 158 to complete the allocation and assignment of resources 14 to the devices 20. For a selected arbitrator 154, the configuration manager 158 supplies a list of device configurations defining required elements of the corresponding resource 14. This list of device configurations is based upon the device information acquired for all of the devices 20 of the computer 8. It will be appreciated that the resource portion of this device information, which can specify resource ranges, particular resource elements and resource dependencies for the devices, will support the prioritized ranking of possible configurations by the configuration manager 158.

For a selected resource 14, if a working configuration solution is developed by the corresponding arbitrator 154, then the resulting resource element assignments are supplied to the configuration manager 158 to enable the allocation of the assigned resource elements to the proper devices 20. However, if a potential resource conflict for a resource element is located by the arbitrator 154, then an error flag is set to advise the configuration manager 158 that a working configuration is not available for this possible configuration. In this event, the configuration manager 158 can either supply an alternative list of device configurations to this arbitrator 154, if available based upon the device information, or can supply a message to the user that requests user input to resolve a resource conflict. Thus, it will be appreciated that the arbitrators 154 support the development of assignments for their respective resources 14 in an iterative fashion based upon the collected device information.

Device Drivers

Device drivers 156 support communications between the devices 20 and the computer 8. For proper computer operations, each device 20 is represented by a corresponding device driver 156. Certain device drivers 156, known as compatible device drivers, are useful for supporting more than one device 20. Information for the device drivers 156 is stored within the registry 153 or can be accessed by reading certain configuration files of the preferred operating system 10, such as the text-based information files called .INF files.

Configuration Manager

The configuration manager 158, which is preferably implemented as a virtual device driver can control the various configuration tasks conducted by or involving the enumerators 150, the hardware tree 152, the registry 153, the arbitrators 154, and the device drivers 156. The configuration manager manipulates three primary data sources, including the device nodes of the hardware tree 152, the hardware tree itself, and the registry 153. When the computer 8 boots, the configuration manager 158 instructs the enumerators 150 to identify the devices 20 of the computer 8, thereby enabling the acquisition of device information for those devices. The configuration manager 158 subsequently examines the device nodes of the hardware tree 152 and, for the devices 20 that are newly installed, will direct the transfer of device information to the registry 153 for archival storage.

The configuration manager 158 also controls the acquisition of appropriate device drivers 156 in response to the stored device information and directs the allocation of the resources 14 in response to the resource assignments supplied by the arbitrators 154. Assigned resource elements are distributed by the configuration manager 158 to the appropriate enumerators 150 to support the resource allocation operation. To complete the configuration process, the configuration manager then controls the loading of the device drivers 156. Accordingly, it will be appreciated that the configuration manager 158 effectively controls the configuration operations by operating as a "traffic cop" to direct the operations conducted by the other components of the operating system 10.

Device Configuration Database

The device configuration database 160, which is typically implemented as one or more files of the operating system 10, contains information about known computer components, including certain devices 20, and their configuration requirements. Upon loading the operating system 10 on the computer 8, this program file is preferably stored on a computer mass storage memory device, such as a fixed disk.

Unlike the registry 153, the information stored in the device configuration database 160 does not necessarily represent data about the set of devices 20 that have been connected at one time or another for operation with the computer 8. Instead, the device configuration database stores general component-level information about existing devices that can be installed for operation with a conventional personal computer, such as the computer 8.

The configuration manager 158 can access the device configuration database 160 for each newly installed device represented in the hardware tree 152 and, if available, copies relevant information concerning the identified device into the registry 153. The relevant information, which typically includes compatible device information and known resource requirements and dependencies, is maintained in the registry 153 by linking this information to the identification code for the identified device 20. Thus, it will be understood that the identification code operates as an entry key for the device configuration database 160.

In addition, during the initial set-up of the operating system 10, information is preferably obtained from the device configuration database 160 for known "legacy" computer components that can be installed for operation with a conventional personal computer. Thus, this device information is preferably stored in the device configuration database 160 and, during the initial set-up of the operating system 10, transferred to the registry 153 under the root branch 188, as illustrated in FIG. 6.

Device information (.INF) files provide the information that the operating system 10 needs to install a given device and its associated software. These files can be maintained within the device configuration database 160. Each .INF file is a collection of sections which describe a particular device 20, the resources 14 required by that device, and the installation procedure. An .INF file for a hardware component preferably includes the sections described below.

Version Section

Contains a header that identifies the .INF file and the class of a device 20 supported by the .INF file.

Class Section

Defines a new class for the device 20.

Manufacturer and Manufacturer Name Sections

Lists all the individual manufacturers of the devices 20 identified in the .INF file and lists devices associated with each of those manufacturers. These entries can be displayed to the user and can be used to generate the appropriate entries within the registry 153. This section preferably contains at least one manufacturer for a device.

Install Section

Describes the device driver 156 and physical attributes of the corresponding device 20. It also identifies the names of all installation sections that contain information and instructions for installing this device.

Miscellaneous Control Sections

Specifies how a device 20 is handled by the user interface of the operating system 10.

Strings Section

Defines all local strings used in the .INF file.

Each section typically starts with a section name enclosed in brackets. Section names are preferably unique. Each section can contain one or more entries. Typically, an entry is a keyname and a value separated by an "=" sign.

Many of the fields defined in the .INF can be written to the registry 153. Because much of the registry 153 is binary data and the .INF file is formatted as text, the .INF permits "ASCII Binary" values, i.e., values which are written as text but represent hex data in Intel byte order. This allows binary data to be moved directly to the registry 153 from an .INF file. .INF files also can contain comments.

Device Manager

The device manager 159 is primarily responsible for setting up the registry 153 and displaying dialog boxes to the user. These dialog boxes prompt for information about adding and modifying device drivers 156. The device manager 159 is also responsible for installing any device drivers 156 for devices enumerated during the operation of the configuration manager 158. However, the device manager 159 relies on an installer 161 to display appropriate dialog boxes or to carry out appropriate installation tasks. Although the device manager 159 can give the installer 161 full control of the installation process, in most cases, the installer 161 simply directs the device manager 159 to complete the task. The installer 161 can insert additional configuration dialogs, hardware detection, and other features into the process as is appropriate for a class of the devices 20.

Overview of Configuration Tasks

Referring now to FIGS. 1 and 4, the configuration tasks are preferably conducted in phases based on real-mode and protected mode operations.

During the real-mode boot process, the devices 20 preferably use only static device configurations; however, dynamic resource allocation or arbitration can be provided as an option for those devices which are adapted for use with the present invention and are required for booting the computer 8. In general, the modified BIOS of the computer control system 21 can configure the devices 20 on the motherboard of the computer 8, i.e., system-level components, in the boot configuration process because the configuration parameters for these devices are known and remain constant. The modified BIOS also can access nonvolatile memory to determine which devices 20 on the integrated bus 15, such as the ISA bus, should be enabled, where their option ROMs should be mapped, and the resource assignment for each of these devices. All devices 20 that do not have a configuration stored in non-volatile memory are preferably disabled by the modified BIOS to eliminate the chance of a configuration conflict.

When the boot process begins, the system remains in real mode. For this preferred process of real-mode initialization, the computer hardware profile is determined, the CONFIG.SYS and AUTOEXEC.BAT files are processed, and the real mode loader (not shown) of the operating system 10 is started. A hardware profile for the computer 8 is preferably generated after the BIOS bootstrap and subsequent to execution of the CONFIG.SYS file. This hardware profile detection process typically combines interrupt checksums, BIOS COM/LPT data, BIOS machine identification data, BIOS docking station data, and, if available, docking station data unique to the vendor, to build the current hardware profile. There is preferably no automated device enumeration at this phase of the boot process. The device drivers 156 that need to be loaded must be explicitly specified by the CONFIG.SYS or AUTOEXEC.BAT files maintained on a mass storage device of the computer 8.

Next, a real mode loader, preferably the virtual machine manager (VMM) (not shown), can load base drivers specified in the registry 153 and static virtual device drivers (VxDs). Base drivers can include the static VxD for the configuration manager 158, as well as the static VxD for the V86 memory manager (not shown) of the operating system 10. The root enumerator is loaded and scans the registry 153 for entries associated with legacy devices. In turn, the root enumerator constructs device nodes within the hardware 152 to represent these legacy devices. If BIOS has not already configured these legacy devices, then the root enumerator can support their configuration. In addition, the ISA enumerator (ISAENM) will be loaded during this phase if an ISA bus exists as the integrated bus 15 in the computer 8. Likewise, if the computer 8 includes a modified BIOS, then the BIOS enumerator is loaded (SysBIOS). Both the ISA enumerator and the BIOS enumerator are preferably loaded based upon corresponding entries within the registry 153.

Upon completing the loading of real mode drivers and static VxDs in the memory 22, the kernel of the operating system 10 has completed its initialization and thereafter switches to protected mode. In this phase, the configuration manager 158 is initialized. The configuration manager 158 imports certain device identification information from the real mode loader. In turn, device nodes in the hardware tree 152 are created by the enumerators 150, resources 14 are allocated, and device drivers 156 are loaded and initialized to support the configuration of the computer 8.

In view of the foregoing, a general review of configuration tasks is now presented based on the representative example of the computer 8 in FIG. 1 and the components of the operating system 10 of FIG. 4. Referring still to FIGS. 1 and 4, it will be understood that the modified BIOS program of the computer control system 21 initiates the detection of the devices 20 that are system-level devices on the motherboard of the computer 8. Although a device node will be formed and stored within the hardware tree 152 for each of the system-level devices, most of these device nodes are not shown in FIG. 5 to simplify this explanation of the configuration phases. Thus, for the purpose of this discussion, only the computer local bus 13 and the integrated bus 15, specifically the ISA bus, are considered as being identified by the operation conducted by the BIOS enumerator 150 for the modified BIOS program. As shown in FIG. 5, the device identification codes for the local bus and the ISA bus are respectively "Root\Root\" and "Root\*PNP0A00\0". Focusing specifically on the device node 164 for the ISA bus, the system bus code is "Root" and the identification code is "*PNP0A00\0".

After enumerating the system-level devices on the motherboard and detecting the integrated bus 15, device-related information is stored in the hardware tree 152 for the existing legacy devices that were designed for use with conventional personal computers. The legacy devices are preferably added to the hardware tree 152 under the local bus device node 162. Thus, the device node 170 for the SCSI bus is added at this time to the hardware tree 152 because the SCSI bus is considered to be an existing legacy-type device. For the device node 170, the system bus code is "Root" and the identification code is "EISAID," which in combination form the device identification code "Root\EISAD\0." At the conclusion of this configuration phase, the hardware tree 152 contains the device nodes 162, 164 and 170, and the registry 153 has been updated as necessary to reflect any new device information contained in the hardware tree 152.

The configuration manager 158 then examines the hardware tree 152 for the entries associated with each device node of the hardware tree 152 and determines the set of devices 20 previously identified by the first configuration phase. In view of the entries for the system busses 18, specifically the ISA bus and the SCSI bus, the configuration manager 158 instructs the assigned enumerators 150 to conduct enumeration operations for the ISA bus and the SCSI bus. For the ISA enumerator, device information is acquired for each of the devices 20 directly connected to the ISA bus, specifically the adapter boards implemented by network card and the modem card, and a system bus 18, the PCMCIA bus. Thus, three new device nodes, the device nodes 166 (network card), 168 (modem card), and 171 (PCMCIA bus) are now added to the hardware tree 152 under the respective device identification codes "*PNP0A00\Net\0", "*PNP0A00\Modem\0", and "*PNP0A00\PCMCIA\0".

In response to the identification of the additional devices 20, the entries in the registry 153 also are updated to reflect the detection of newly installed devices as required. In turn, the appropriate device drivers 156 are identified for the network card and the modem card. The configuration manager 158 will then load the device loader (not shown) for each of these devices 20 based on information in the registry 153.

The configuration manager 158 then instructs the appropriate arbitrators 154 to develop an assignment for the resources 14 based on the resource requirements and constraints for the detected devices 20. In particular, the configuration manager 158 calls a selected arbitrator 154 and, if it returns a valid resource allocation, then the configuration manager 158 will call the next arbitrator 154 until all resources are properly allocated. If an invalid allocation is returned by one of the arbitrators 154, the configuration manager 158 initiates a new round of exchanges with the arbitrators 154 based on other possible device configurations supported by the various devices 20. The assigned elements of the resources 14 will be supplied by the configuration manager 158 to the detected devices 20 via the abstraction layer supplied by the enumerators 150.

Upon a determination of a proper working configuration and assignment of the necessary resources, the configuration manager 158 will instruct an associated device loader program (not shown) to load the identified device drivers 156, thereby enabling the operation of the network card and the modem card with the computer 8 (as well as the detected busses).

In view of the foregoing explanation regarding the ISA bus, it will be understood that a similar configuration process would be completed for the devices 20 connected to the PCMCIA bus and the SCSI bus of the computer 8. For example, the devices 20 connected to the sockets of the PCMCIA bus, which is typically installed as an adapter card connected to the ISA bus, are enumerated after configuration of the devices 20 on the ISA bus. Specifically, the configuration manager 158 calls an PCMCIA enumerator 150 to enumerate the devices on the sockets of the PCMCIA bus. For each detected device, a device identification code, also described as a device ID, is generated based on the tuples maintained on the board representing the device. In addition, logical configuration data preferably will be created based on the tuples on the PCMCIA-compatible card. As part of the enumeration process, the PCMCIA enumerator 150 creates device nodes within the hardware tree 152 for each of the devices 20 associated with the cards in the PCMCIA sockets. As described above with respect to the ISA bus, these additional device nodes for the hardware tree 152 support the configuration of the devices 20 connected to the sockets of the PCMCIA bus Resource Arbitration Referring still to FIGS. 1 and 4, the configuration manager 158 develops a list of possible device configurations based upon the device information obtained for the devices 20 of the computer 8. Specifically, the configuration manager develops a device configuration based on the resource requirements and constraints defined by the logical configuration data for a corresponding device. Based upon the operating requirements of a particular device, the corresponding device configuration may define one or more requirements for resource elements. A device configuration may define specific resource elements required by the device and, for another device, the device configuration may describe a range of general resource element requirements. For example, a possible device configuration for a modem may define specific interrupt requirements, namely, IRQ2 and IRQ3. In contrast, the device configuration for another peripheral device may define a more general requirement for any one interrupt element selected from a range of interrupts, such as IRQ2 through IRQ8. In general, each list of device configurations is directed to a single resource 14 and is developed for use by the arbitrators 154 associated with that resource.

The overall goal of the arbitration process is to allocate resource elements to the devices 20 by satisfying the resource element requirements specified in the list of device configurations. Each arbitrator 154 receives a list of device configurations to support the allocation of elements of its corresponding resource 14. In response to the successful allocation of resource elements by the arbitrators 154, each of the devices 20 will receive the appropriate allocated resource elements.

In response to a list of device configurations, a selected arbitrator 154 attempts to allocate the elements of its resource 14 based on the resource element requirements of the device configurations and the available resource elements of the computer 8. If the selected arbitrator 154 successfully completes the allocation of its resource elements, then the configuration manager is advised of the configuration success. Upon the successful allocation of resource elements by the arbitrators 154, the configuration manager 158 will update device nodes of the hardware tree 152 with the assigned resource elements. The assigned elements of the resources 14 will be supplied by the configuration manager 158 to the detected devices 20 via the abstraction layer supplied by the enumerators 150.

If an error message declaring configuration failure is returned by one of the arbitrators 154, the configuration manager 158 can attempt to initiate a new round of exchanges with the arbitrators 154 based on other possible device configurations supported by the various devices 20. For example, if an initial list of device configurations fails to support the successful assignment of resource elements, the configuration manager 158 can respond to this resource arbitration failure by attempting to develop, if possible, an alternative list of possible device configurations. This alternative list of device configurations can be derived from logical configuration data for the devices 20 that can accept alternative resource element assignments. If more than one alternative list of device configurations is available, the configuration manager 158 will preferably select the alternative list that defines the least complex set of resource requirements.

A configuration failure will be declared in the event that the available resource elements of the computer 8 can not satisfy the resource elements defined by the possible lists of device configurations. In this event, the operating system preferably advises the user about the resource conflict.

To support the arbitration process, each arbitrator 154 preferably maintains a pair of tables or lists, a first table containing entries representing allocated resource elements and a second table including entries representing reserved resource elements. The first table, which is commonly described as the "allocated resource list", represents a list of the present resource element assignments for the devices 20 installed for use with the computer 8. Upon the assignment of a resource element for a particular device configuration, the assigned resource element is added as an entry to the allocated resource list. It will appreciated that the entries of the allocated resource list can be modified in response to the removal of an existing device or the insertion of a new device. Also, the allocated resource list can be rebuilt with new entries in response to powering the computer 8.

The second table maintained by each arbitrator 154 is commonly described as the "reserved resource list". The reserved resource list contains entries containing resource elements that are reserved for assignment to certain known devices 20 that require selected resource elements. For example, it is well known that certain devices require access to particular elements of one or more of the resources 14 for proper operation within the computing environment. A modem is a representative device that typically requires the use of reserved resource elements because a modem is generally designed to use interrupts IRQ2 and IRQ3. Likewise, many printers are typically designed to use another particular resource element, the interrupt IRQ7. In view of the foregoing, it can be anticipated that certain devices 20 will require access to particular resource elements. For known devices, particular resource elements are maintained for possible use if this type of device is actually installed for operation in the computer 8. The reserved resource list supplies the mechanism for storing these resource elements "in reserve" to satisfy the requirements of selected devices 20 for specific resource elements.

The initial entries for the reserved resource list are preferably constructed and stored prior to the distribution of the operating system 10 to an end user. Representative entries can include the I/O port 102 to support the configuration of the system board of the computer 8, and standard LPT/COM resource elements. However, the arbitration process also can add resource elements to the reserved resource list as required "on the fly". One example is a device that supports only one possible configuration for a resource, such as a device that supports a range of interrupts 24, but only one address for an I/O port 28. For this example, the I/O range is added to the reserved resources list because the resource element requirement for this device defines only a single I/O port address. The reserved resource list is preferably saved to the registry 153 and will be merged with any new entries of the registry 153. in response to the next boot.

The allocated resource list can be stored within volatile memory, such as the memory 22, because resource element assignments may change each time the computer 8 is powered. In contrast, the reserved resource list is preferably stored within non-volatile memory, such as a hard disk drive, to maintain an archival list of reserved resource elements.

Each arbitrator 154 can also support another resource table containing entries representing "preallocated" resource elements. This preallocated resource list, which is typically linked to the allocated resource list, defines a set of preallocated resource elements for use by certain types of prior art devices, i.e., those devices that do not readily support the collection of device information from an onboard storage mechanism. Because the resource requirements for many prior art devices are well-known, the resource elements to satisfy such requirements can be "preallocated" for selected devices in the event that those devices are installed within the computer 8. Nevertheless, it will be appreciated that preallocated resource elements may also be assigned to devices 20 for which device information is readily available, such as boot-level devices. For example, the preallocated resource list can include some initial entries, such as the I/O for the video graphics adapter (VGA) ports, IRQ 2 (the cascading interrupt), and IRQ 13 (the math coprocessor interrupt). In general, an element of a resource 14 listed in the linked lists of allocated and preallocated resources is considered to be available for assignment to boot-level devices. Other preallocated resource elements can be added "on the fly" when a legacy device requests a specific resource element.

Tables 1-3 illustrate representative examples of the entries for the allocated, preallocated, and reserved resource lists for the selected resource 14 of the I/O ports 28.

TABLE 1

Allocated Resource List - I/O ports

| | |
|---|---|
| 00000000-000000ff | 00000170-00000177 |
| 00000376-00000376 | 00000378-0000037b |
| 000003f0-000003ff | 0000040b-0000040b |
| 00000487-00000487 | 00000489-0000048c |
| 00002501-00002510 | 0000fc80-0000fcff |
| 000001f0-000001f7 | 000002f8-000002ff |
| 000003b0-000003bb | 000003c0-000003df |
| 00000410-0000043f | 00000481-00000483 |
| 000004d6-000004d6 | 00000cf8-00000cff |

TABLE 2

Preallocated Resource List - I/O ports

| | |
|---|---|
| 00000010-0000001f | 00000022-0000003f |
| 00000065-0000006f | 00000072-00000077 |
| 000000a2-000000bf | 000000df-000000ef |
| 00000044-0000005f | 00000062-00000063 |
| 0000007a-0000007f | 00000091-00000093 |

TABLE 3

Reserved Resource List - I/O ports

| | |
|---|---|
| 00000000-0000000f | 00000020-00000021 |
| 00000064-00000064 | 00000070-00000071 |

TABLE 3-continued

Reserved Resource List - I/O ports

| | |
|---|---|
| 00000094-000000a1 | 000000c0-000000df |
| 00000170-00000177 | 000001f0-000001f7 |
| 00000340-0000035f | 00000376-00000376 |
| 000003b0-000003bb | 000003c0-000003df |
| 00000800-000008ff | 00000c00-00000cff |
| 00001800-000018ff | 00001c00-00001cff |
| 00002501-00002510 | 00002800-000028ff |
| 00003400-000034ff | 00003800-000038ff |
| 00004400-000044ff | 00004800-000048ff |
| 00005400-000054ff | 00005800-000058ff |
| 00006400-000064ff | 00006800-000068ff |
| 00007400-000074ff | 00007800-000078ff |
| 00008400-000084ff | 00008800-000088ff |
| 00009400-000094ff | 00009800-000098ff |
| 0000a400-0000a4ff | 0000a800-0000a8ff |
| 0000b400-0000b4ff | 0000b800-0000b8ff |
| 0000c400-0000c4ff | 0000c800-0000c8ff |
| 0000d400-0000d4ff | 0000d800-0000d8ff |
| 00000040-00000043 | 00000060-00000061 |
| 00000078-00000079 | 00000080-00000090 |
| 000000f0-000000ff | 00000102-00000102 |
| 00000210-0000022f | 000002f8-0000030f |
| 00000378-0000037f | 00000388-0000038b |
| 000003e8-000004ff | 00000604-0000060b |
| 00001000-000010ff | 00001400-000014ff |
| 00002000-000020ff | 00002400-000024ff |
| 00002c00-00002cff | 00003000-000030ff |
| 00003c00-00003cff | 00004000-000040ff |
| 00004c00-00004cff | 00005000-000050ff |
| 00005c00-00005cff | 00006000-000060ff |
| 00006c00-00006cff | 00007000-000070ff |
| 00007c00-00007cff | 00008000-000080ff |
| 00008c00-00008cff | 00009000-000090ff |
| 00009c00-00009cff | 0000a000-0000a0ff |
| 0000ac00-0000acff | 0000b000-0000b0ff |
| 0000bc00-0000bcff | 0000c000-0000c0ff |
| 0000cc00-0000ccff | 0000d000-0000d0ff |
| 0000dc00-0000dcff | 0000e000-0000ffff |

It will be appreciated that the lists of allocated, reserved and preallocated I/O ports in Tables 1-3 are machine-specific, i.e., the entries are based on the particular device configuration of the associated computer. In addition, these lists are also dependent on the history of the particular computer because the reserved resource list from one boot to another is preferably merged and written to the registry 153. Also, the lists are dependent on machine architecture, i.e., whether the integrated bus 15 is an ISA, EISA or MCA bus architecture.

Table 4 illustrates representative entries for the allocated, preallocated, and reserved resource lists for the selected resource 14 of the interrupts 24.

TABLE 4

Resource Lists--Interrupt Requests
(Allocated, Preallocated, Reserved)

| Int NUMBER | 08 | 09 | 0A | 0B | 0C | 0D | 0E | 0F |
|---|---|---|---|---|---|---|---|---|
| IRQ NUMBER | 00 | 01 | 02 | 03 | 04 | 05 | 06 | 07 |
| Alloc'd by arbitrator: | Y | Y | Y | Y | Y | . | Y | Y |
| Preallocated: | . | . | . | . | . | . | . | . |
| Shareable: | . | . | . | Y | Y | . | . | . |
| Reserved: | Y | Y | Y | Y | Y | Y | Y | Y |
| Int NUMBER | 70 | 71 | 72 | 73 | 74 | 75 | 76 | 77 |
| IRQ NUMBER | 08 | 09 | 0A | 0B | 0C | 0D | 0E | 0F |
| Alloc'd by arbitrator: | Y | . | . | Y | Y | Y | Y | Y |
| Preallocated: | . | . | . | . | . | . | . | . |

TABLE 4-continued

Resource Lists--Interrupt Requests
(Allocated, Preallocated, Reserved)

| Shareable: | . | . | . | Y | . | . | . | . |
|---|---|---|---|---|---|---|---|---|
| Reserved: | Y | Y | Y | Y | Y | Y | Y | Y |

For the DMA 26, the allocated resource list typically includes two allocated DMA channels and the preallocated resource list includes two preallocated DMA channels. In contrast, the resource lists for the memory 22 includes all ROM and RAM as allocated and preallocated resource elements.

In general, a resource element is available for possible allocation to a device 20 if this element has not been previously allocated for use by another device 20. To determine whether a resource element is available, the arbitrator 154 first checks the entries of the allocated resource list and, if necessary, then checks the reserved resource list. It will be appreciated that the reserved resource list is used to prioritize the allocation of resource elements for use by the devices. Specifically, reserved resource elements are assigned by the arbitrator 154 only if (1) these elements are available for assignment and (2) no other type of resource element with a lower priority, i.e., a nonreserved resource element, is available to satisfy the resource requirement defined by the device configuration.

The exception to this general allocation process is boot allocation, i.e., the allocation of resource elements for use by boot-level devices. During boot configuration, the arbitrator 154 checks the entries of the linked lists of the allocated resource list and the preallocated resource list. Preallocated resource elements are generally available only to boot-level devices. Consequently, the preallocated resource list is normally not examined during the allocation of resource elements to devices that are not required for operation when the computer is booted.

Figure 7:
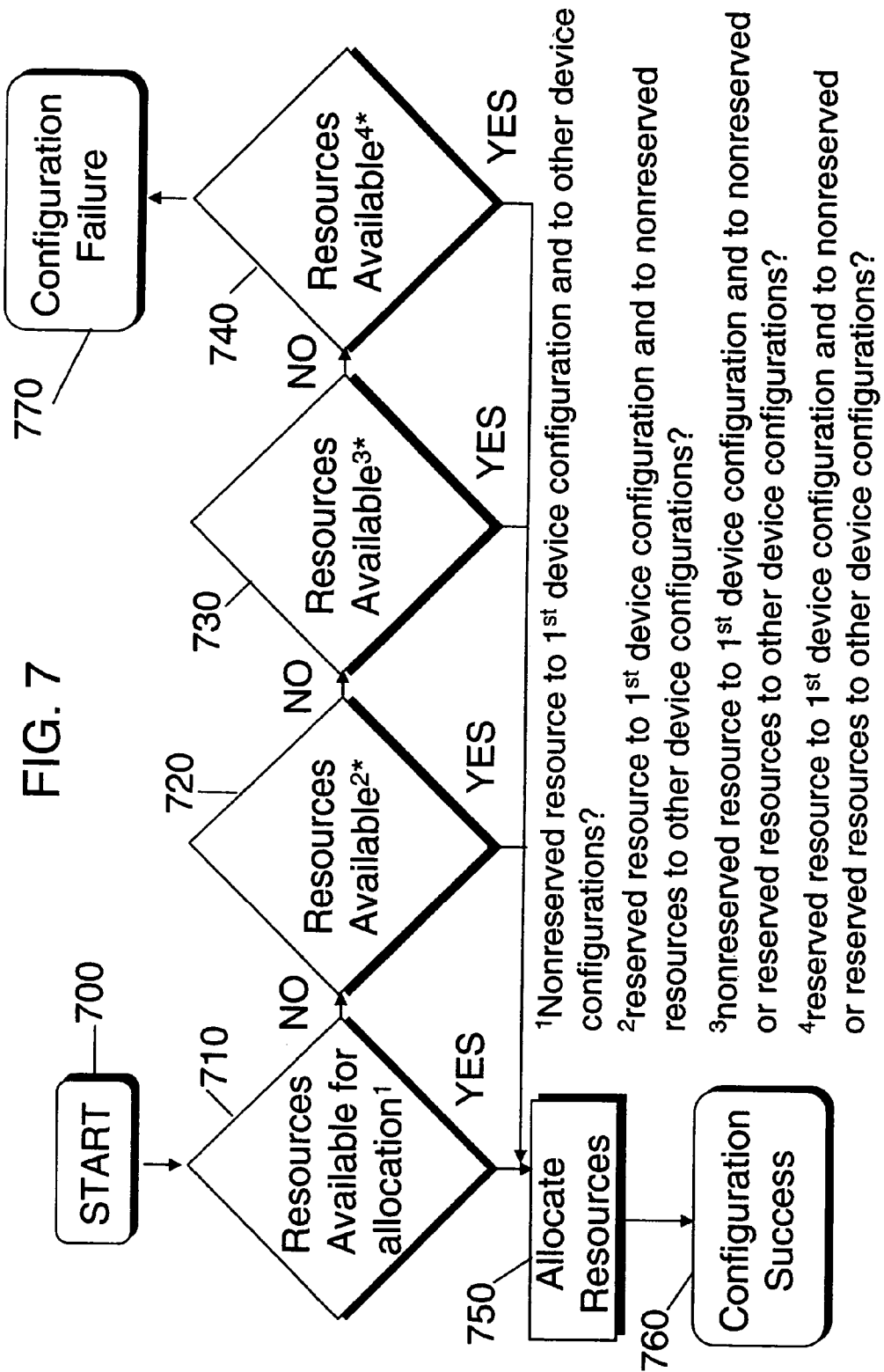
FIG. 7 is a logical flow diagram that generally illustrates the arbitration tasks of the present invention.

FIG. 7 presents a simplified view of the primary tasks completed during the arbitration process. A more detailed view of the recursive operations conducted during the arbitration process will be described below with respect to FIGS. 10A-10E. A review of the primary arbitration tasks shown in FIG. 7 should facilitate an understanding of the recursive operations completed by the preferred arbitration process of FIGS. 10A-10E.

Referring now to FIGS. 1, 4, and 7, the arbitration process begins at the START step 700 in response to an arbitrator 154 receiving a list of device configurations from the configuration manager 158. The configuration manager 158 can sort the list of device configurations based on the number of possible resource requirements for a particular type of resource. This sort, which is preferably completed for device configurations representing nonboot-level devices, is based on the complexity of the requirement for resource elements, as defined by each device configuration. The configuration manager 158 passes the list of device configurations to the arbitrator 154 representing the selected type of resource 14, such as the memory 22, interrupts 24, DMA channels 26, and I/O ports 28.

In decision step 710, an inquiry is conducted to determine if (1) the resource requirements for the first device configuration of the list can be satisfied by the allocation of an available nonreserved resource element and (2) the resource requirements of remaining device configurations of the list can be satisfied by the allocation of available nonreserved resource elements. In other words, this inquiry examines whether the device represented by the first device configuration can use an available nonreserved resource element and, in addition, if all remaining devices represented by the other device configurations can also use available nonreserved resource elements. The preferred arbitration process attempts to first allocate available nonreserved resource elements prior to allocating the more "limited" reserved resource elements.

If the response to the inquiry in step 710 is negative, then the "NO" branch is followed to step 720. In step 720, an inquiry is conducted to determine (1) whether a reserved resource element is available to satisfy the resource requirements for the first device configuration, and (2) whether nonreserved resource elements are available to satisfy the resource requirements for the remaining device configurations of the list. If the response to the inquiry in step 720 is negative, then the "NO" branch is followed to step 730.

In step 730, an inquiry is conducted to determine (1) whether a nonreserved resource element is available to satisfy the resource requirements for the first device configuration, and (2) whether either nonreserved or reserved resource elements are available to satisfy the resource requirements for the remaining device configurations. If the response to this inquiry is negative, then the "NO" branch is followed from step 730 to step 740.

In step 740, an inquiry is conducted to determine (1) whether a reserved resource element is available to satisfy the resource requirements for the first device configuration, and (2) whether either nonreserved or reserved resource elements are available to satisfy the resource requirements for the remaining device configurations of the list. If the response to this inquiry is negative, then the "NO" branch is followed to step 770 and a configuration failure is declared by the arbitration process. This arbitrator 154 preferably declares a configuration failure by passing an error message to the configuration manager 158.

If the arbitrator 154 supplies the configuration manager 158 with a "configuration failure" error message, then the configuration manager 158 determines whether another possible list of device configurations is available for input to the arbitration process. If so, the configuration manager 158 passes the arbitrator 154 with a "new" list of device configurations, and the process begins anew. This iterative process can continue until the arbitrator 154 advises the configuration manager 158 of a configuration success or until all possible lists of device configurations have been examined by the arbitrator 154. Otherwise, the configuration manager 158 generates an error message and, in turn, the operating system 10 preferably generates a message advising the user of a resource element conflict It will be appreciated that the list of alternative device configurations can also sorted based upon the complexity of the alternative list. The configuration manager 158 initially selects the alternative list of device configurations having the least complex set of resource requirements and sorts the device configurations based upon the complexity of the resource requirements defined by each device configuration.

If the response to an inquiry conducted in step 710, 720, 730 or 740 is positive, then the "YES" branch is followed to step 750. In step 750, the available resource elements are allocated to satisfy the resource element requirements defined by the device configurations of the list. The arbitrator 154 allocates resource elements by updating the entries of the allocated, reserved, and preallocated resource lists. During the resource arbitration process, the arbitrator 154 preferably maintains the resource element assignments in one or more temporary lists stored in system memory, such as the memory 22. Upon configuration success, the allocated, reserved, and preallocated resource lists are then updated, as required, with the current resource element assignments by merging the contents of the temporary lists with the existing contents of the resource lists. Upon allocation of the resource elements, the arbitrator 154 declares a configuration success in step 760 and advises the configuration manager 158 about the assigned resource elements. In response to the successful allocation of resource elements by each of the arbitrators 154, the configuration manager 158 responds by updating the hardware tree 152 with the resource element assignments.

For the preferred embodiment, the list of device configurations can include a data structure defining a resource requirement element and a resource allocation element. The resource requirement element describes the particulars for the required resource element, whereas the resource allocation element is defined or "filled-in" by an arbitrator 154 in response to a successful allocation of the required resource element. The resource allocation elements are passed to the configuration manager 158 by the arbitrators 154 in response to a successful allocation of resource elements. In turn, the configuration manager 158 updates the hardware tree 152 with the allocated resource elements. This information can be accessed by the enumerators and the device drivers to support the configuration of the computer 8. The configuration manager 158 also responds to the configuration success message from the arbitrators 154 by advising each of the artibrators to update the allocated, reserved and preallocated resource lists, as required, with the contents of the temporary lists produced during the arbitration process.

The arbitration process preferably first attempts to assign resource elements to satisfy the device configurations for boot-level devices. In turn, the arbitration process will then attempt to assign resource elements to satisfy the resource requirements set forth by device configurations for "basic" devices, i.e., those devices that do not require activation during the computer boot. Accordingly, logical configuration data for a device 20 will typically include a designation of whether such data is associated with a boot-level device or a basic device. This suggests that the hardware tree 152 can contain two types of logical configuration data, a first type for boot-level devices and a second type for basic devices. The first and second types of logical configuration data are preferably maintained within linked lists of logical configuration data within the hardware tree 152. The two linked lists of logical configuration data support a two-stage process for resource arbitration, a first arbitration process for boot-level devices and a second arbitration process for basic devices.

During the computer boot, the configuration manager 158 completes a first pass of the hardware tree 152 to support the arbitration process for boot-level devices. The configuration manager 158 examines each device node having logical configuration data for boot-level devices during this first pass to build the list of device configurations. This examination of device nodes is completed based upon the levels of the hardware tree 152. The highest level of the hardware tree 152 is preferably examined first, which is typically represented by legacy device(s) and the modified BIOS, and remaining levels are then examined in successive order. This allows the configuration manager 158 to develop a list of device configurations for the boot-level devices based on the logical configuration data for these devices. These device configurations, which are described as boot device configurations, typically specify a requirement for a particular resource element. In response to this list, the arbitrator for a resource 14 completes the boot arbitration process. Resource elements available for allocation to boot-level devices include (1) resource elements that are not allocated and (2) resource elements that are allocated and preallocated. In other words, resource elements are available for allocation to boot-level devices if (1) the resource element is not listed in the allocated resource list or (2) the allocated and preallocated resource list include an entry for this resource element.

Upon completion of this first pass, the configuration manager 158 conducts a second pass of the hardware tree 152 to examine the device nodes containing entries representing logical configuration data for basic devices. Again, the configuration manager 158 examines a single device node at a time based upon the levels of the hardware tree 152. In this manner, the configuration manager 158 develops another list of device configurations commonly described as basic device configurations. This list of basic device configurations is preferably sorted based on the number of possible resource requirements for a particular type of resource. Thus, it will be understood that this sort is based on the complexity of the requirement for resource elements, as defined by each device configuration. A device configuration defining multiple resource elements requirements for a corresponding device can be considered to be more complex than a device configuration defining a single resource element requirement for the device. In this manner, the configuration manager 158 sorts the list of possible device configurations to form a sorted list ordered from least complex device configuration to most complex device configuration. In response to the sorted list, the general tasks of the arbitration process shown in FIG. 7 are then completed by an arbitrator 154, as required, in an attempt to allocated resource elements for the basic devices.

FIG. 8 is a logical flow diagram that generally illustrates the two-stage approach for allocating resource elements to satisfy the requirements set forth by device configurations for boot-level devices and basic devices. Referring now to FIGS. 1, 4, and 8, the process begins at the START step 800, and proceeds to step 805. In step 805, a list of device configurations for the boot devices is obtained. This list is developed by the configuration manager 158 based upon its first pass of the device nodes of the hardware tree 152. In contrast to the list of device configurations for basic devices, no requirement exists to sort or otherwise order the list of device configurations for boot devices. This absence of a sort requirement is generally a result of the one-to-one correspondence between required resource elements for boot devices and their device configurations. In other words, each boot device typically requires access to a specific resource element rather than a resource element selected from a range of resource elements. Upon completing the development of the list of device configurations for boot devices, the configuration manager 158 passes this list to the arbitrator 154 associated with the selected resource.

In decision block 810, an inquiry is conducted to determine whether the resource elements defined by the boot device configurations are available to satisfy the resource requirements of the boot devices. If resource elements are available to satisfy the requirements defined by this list of boot device configurations, then the "YES" branch is followed to step 820. Resource elements are available for assignment to boot-level devices if the resource elements are (1) not allocated or (2) allocated and preallocated.

In the event that resource elements are not available to satisfy the resource element requirements defined by the list of device configurations, the arbitration process fails and the "NO" branch is followed to step 815. In step 815, the arbitrator 154 reports a configuration failure to the configuration manager 158 via the mechanism of an error message.

In step 820, available resource elements are assigned for use by the boot devices. The assigned resource elements are passed by the arbitrator 154 to the configuration manager 158 which, in turn, supplies this information to the hardware tree 152. These resource elements are assigned by advising the drivers for the boot devices 20 of their respective resource assignments. The allocated resource list is then updated by the arbitrator 154 to maintain a current record of resource element assignments.

Upon completion of the allocation of resource elements for use by boot devices, the configuration manager 158 obtains an ordered list of device configurations defining the resource element requirements for basic devices. FIG. 9 is a logical flow diagram that illustrates the steps of the process for obtaining the ordered list of possible basic device configurations. Referring briefly to FIGS. 4 and 9, the process starts at the START step 900 and proceeds to step 910. In step 910, logical configuration data is acquired for each of the basic devices. Specifically, the configuration manager 158 conducts a second pass of the hardware tree 152 to obtain the logical configuration data from the device nodes representing basic devices. In step 920, the configuration manager 158 prepares a list of possible device configurations based upon the logical configuration data obtained in step 910. The possible device configurations are then sorted in step 930 based upon the complexity of the resource requirements defined by these device configurations. The sorted list is preferably ordered from least complex device configuration to most complex device configuration.

Returning now to FIGS. 1, 4, and 8, the arbitration process of FIG. 8 continues by comparing the sorted list of basic device configurations to the available resource elements in decision block 830 to determine whether the resource element requirements for the basic devices can be satisfied by the finite resources of the computer 8. During this inquiry, a determination is made whether resource elements are available to satisfy the resource element requirements defined by the list of device configurations for the basic devices. This inquiry is generally conducted by completing the successive tasks, as required, for the resource arbitration process shown in FIG. 7. If the desired resource elements are available, then the "YES" branch is followed from step 830 to step 835. In turn, resource elements are assigned for use by the basic devices in step 835, and a configuration success is declared in step 840.

The arbitrator 154 advises the configuration manager 158 of resource assignments in response to declaring a configuration success. The configuration manager 158 responds by placing the resource element assignments in the hardware tree 152. These assigned resource elements are maintained in the device nodes representing the basic devices. The arbitrator 154 assigns resource elements by adding entries to the allocated resource list and, as required, to the preallocated and reserved resource list. Specifically, the arbitrator 154 transfers the allocated resource elements from the temporary storage list to the resource list(s) in response to a message from the configuration manager 158. The resource element assignments are now available for use by the enumerators 150 and the device drivers 156 to support the configuration of the devices 20.

In contrast, if the response in step 830 is negative then the "NO" branch is followed to step 845, and the arbitration process fails. The arbitrator 154 will advise the configuration manager 158 of the resource arbitration failure by generating an error message.

In some instances, during the arbitration process, a resource element conflict arises in which apparently separate devices 20, such as a legacy device and a device compatible with the present invention, require use of a resource element that has been "allocated" for one device and "preallocated" for the other device. In this event, it is necessary to conduct an inquiry to determine if a pair of device nodes in the hardware tree 152 actually represent the same device. Specifically, this inquiry determines whether the devices represented by the pair of device nodes have the same identification code and require the same logical configuration data. If so, then the arbitrator 154 deletes the entry in the preallocated resource list and maintains the entry in the allocated resource list. Also, the configuration manager 158 deletes the "duplicate" device node from the hardware tree 152 in the event that both device nodes have the same identification code and same logical configuration data. In the event of an actual conflict, the configuration manager 158 can generate a message to the end user that manual intervention may be required to resolve the resource conflict.

FIGS. 10A-10E, which are collectively described as FIG. 10, are logical flow diagrams that illustrate the recursive nature of the preferred process for resource arbitration. As shown in FIG. 10, the preferred process for resource arbitration can be viewed as a recursive technique applicable to the allocation of resource elements for the basic devices. For example, if the present device configuration defines a requirement for a resource element that is not available, then the preferred arbitration process will attempt to obtain a previous device configuration, if available, from the list of device configurations. Any prior resource element allocated to this previous device configuration is unallocated prior to attempting to assign another resource element to this device configuration. A resource element can be unallocated by removing the entry for this resource element from the allocated resource list (or the temporary list maintained by the arbitrator 154 during the arbitration process). In this manner, the resource arbitration process attempts to address the failure to assign a desired resource element to a present device configuration by revisiting the resource element requirements of a previous device configuration.

The reexamination of the resource element requirements of the previous device configuration is based on the prior state for which each resource element had been assigned to this device configuration. These states can include:

| | |
|---|---|
| State 1: | Attempt to satisfy the resource element requirement of the current device configuration by the assignment of a nonreserved resource element, and attempt to satisfy the resource element requirements of all remaining device configurations by the assignment of nonreserved resource elements. |
| State 2: | Attempt to satisfy the resource element requirements for the current device configuration by the assignment of a reserved resource element, and attempt to satisfy the resource element requirements of all remaining device configurations by the assignment of nonreserved resource elements. |
| State 3: | Attempt to satisfy the resource element requirements for the current device configuration by the assignment of a nonreserved resource element, and attempt to satisfy the resource element requirements for all remaining device configurations by the assignment of nonreserved resource elements. |
| State 4: | Attempt to satisfy the resource element requirements for the current device configuration by the assignment of a nonreserved resource element, and attempt to satisfy the resource element requirements of all remaining device configurations by the assignment of nonreserved or reserved resource elements. |
| State 5: | Attempt to satisfy the resource element requirement for the current device configuration by the assignment of a reserved resource element, and attempt to satisfy the resource element requirements for all remaining device configurations by the assignment of nonreserved or reserved resource elements. |

Figure 10A:
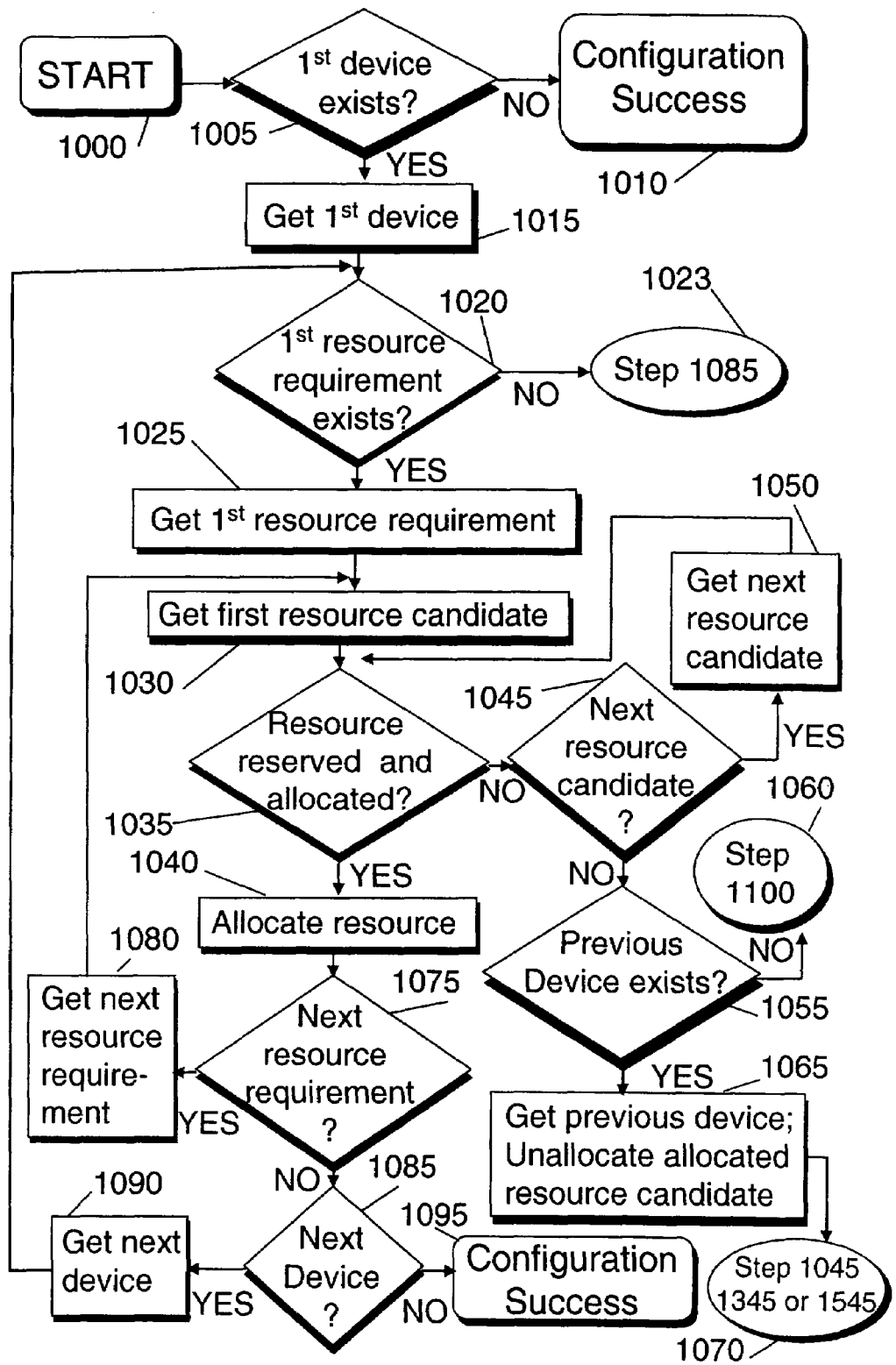
FIGS. 10A-10E are logical flow diagrams that illustrate the steps of a method for arbitrating computer resources for allocation to devices of the computer in accordance with the preferred embodiment of the present invention.

Referring still to FIGS. 10A-10E, the preferred arbitration process begins in State 1 at the START step 1000 of FIG. 10A with a list of device configurations. At decision block 1005, an inquiry is conducted to determine whether a first device configuration exists in the list of device configurations. If the response to this inquiry is negative, then the "NO" branch is followed from steps 1005 to step 1010, and configuration success is declared. In this event, the arbitrator 154 passes to the configuration manager 158 a message advising configuration success. By contrast, if the response is positive, then the "YES" branch is followed from step 1005 to step 1015, and the first device configuration is selected from the list of device configurations.

In response to the first device configuration, an inquiry is conducted at decision block 1020 to determine whether a first resource requirement exists. If the response to this inquiry is negative, then the "NO" branch is followed from step 1020 to step 1023. In step 1023, the process branches to the decision block at step 1085, in which an inquiry is conducted to determine whether another device configuration is available from the list of device configurations. However, if the response to the inquiry in steps 1020 is positive, then the "YES" branch is followed to step 1025.

In step 1025, the first resource element requirement of the selected device configuration is obtained. In response, a resource element candidate is obtained in step 1030 in an effort to match an available resource element to the first resource element requirement. At the decision block 1035, an inquiry is conducted to determine whether the resource element corresponding to the selected resource element candidate is (1) a nonreserved resource element and (2) not allocated for use by another of the devices 20. The arbitrator 154 conducts this inquiry by examining the allocated resource list to determine whether this resource element candidate has been allocated based on an entry in the allocated resource list. If neither the allocated resource list nor the reserved resource list includes an entry for this resource element candidate, then the "YES" branch is followed to step 1040. In step 1040, the desired resource element is allocated to satisfy the resource element requirement.

However, if the response to the inquiry in step 1035 is negative, the "NO" branch is followed to step 1045. At decision block 1045, a determination is made whether another resource element candidate is available to satisfy the selected resource element requirement. If so, the "YES" branch is followed from step 1045 to step 1050, and the next resource element candidate is obtained. The process then continues via a loop from the step 1050 to the step 1035.

If another resource element candidate is not available, then the "NO" branch is followed from step 1045 to the decision block at step 1055. A determination is made at the decision block 1055 whether a previous device configuration exists. In other words, an inquiry is conducted to determine whether the resource arbitration process has previously examined another device configuration of the list of device configurations. If not, the "NO" branch is followed from step 1055 to step 1060. At step 1060, the process branches to step 1100 (FIG. 10B) in STATE 2.

Figure 10B:
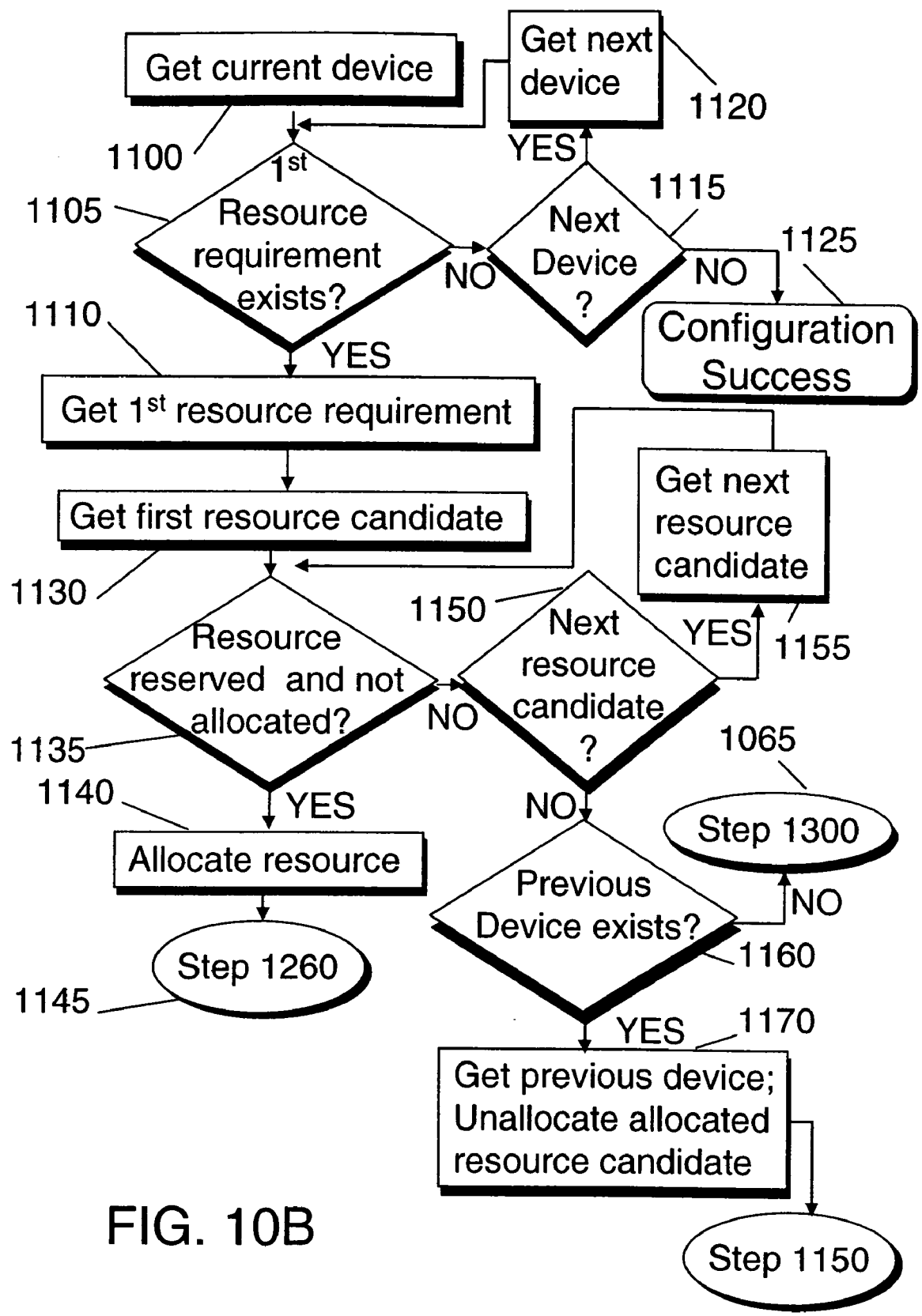

However, if the response to the inquiry in step 1055 is positive, the "YES" branch is followed to step 1065. In step 1065, the previous device configuration is obtained from the list of device configurations. Because this previous device configuration is associated with a corresponding state of the arbitration process, this previous state is also obtained to support the present resource arbitration task. In addition, the allocated resource element associated with this previous device configuration is unallocated. In step 1070, if the previous state was State 1, the process branches to step 1045. In similar fashion, if the previous state was State 4, the process branches to step 1345 (FIG. 10D). Likewise, if the previous state was State 5, the process branches to step 1445 (FIG. 10E). In steps 1045, 1345 (FIG. 10D), and 1445 (FIG. 10E), an inquiry is conducted to determine whether another resource element candidate is available to satisfy the present resource element requirement.

In response to allocating a resource element in step 1040, the process proceeds to the decision block in step 1075. In step 1075, an inquiry is conducted to determine whether another resource element requirement is available from the present device configuration. If so, the "YES" branch is followed to step 1080, and the next resource element requirement is obtained. In turn, a loop is followed from step 1080 to step 1030. In contrast, if the response to this inquiry in step 1075 is negative, the "NO" branch is followed to the decision block at step 1085.

In step 1085, an inquiry is conducted to determine whether another device configuration is available from the list of device configurations. If so, the "YES" branch is followed to step 1090, and the next device configuration is obtained from the list. The process then loops back to step to step 1030. However, if the response to the inquiry of step 1085 is negative, the "NO" branch is followed to step 1095, and a configuration success is declared. In this event, the arbitrator 154 sends a configuration success message to the configuration manager 158. Subsequently, the configuration manager 158 passes the allocated resource elements to the hardware tree 152 for use by the enumerators 150 and the device drivers 156. In addition, the configuration manager 158 notifies the arbitrator 154 to update the allocated resource list based on the temporary list developed during the arbitration process.

As previously described with respect to step 1060 of FIG. 10A, the arbitration process branches to step 1100 in the event that a previous device configuration does not exists. Referring now to FIG. 10B, in step 1100, the current device configuration is obtained and, in step 1105, an inquiry is conducted to determine whether this device configuration contains a resource element requirement. If so, the "Yes" branch is followed to step 1110, and a selected resource element requirement is obtained from the current device configuration. In contrast, if a resource element requirement does not exist, the "NO" branch is followed from step 1105 to the decision block of step 1115. In step 1115, a determination is made whether another device configuration is available in the list of device configurations. If so, the "YES" branch is followed from step 1115 to step 1120, and the next device configuration is obtained. The process then loops back to step 1105 from step 1120 and begins anew. However, if another device configuration is not available in step 1115, the "NO" branch is followed to step 1125, and a configuration success is declared.

In response to the acquisition of the resource element requirement in step 1110, the process proceeds to step 1130. In step 1130, a resource element candidate is obtained to check for allocation. In turn, an inquiry is conducted in step 1135 to determine whether the selected resource element candidate represents a resource element that is (1) reserved and (2) not allocated for use by another device 20. If so, the "YES" branch is followed from step 1135 to step 1140, and this resource element is allocated to satisfy this resource element requirement. In step 1145, the process then branches to step 1260 (FIG. 10C) in State 3.

If the response to the inquiry in step 1135 is negative, the "NO" branch is followed from step 1135 to step 1150. In step 1150, a determination is made whether another resource element candidate is available for comparison to the resource element requirement. If so, the "YES" branch is followed from step 1150 to step 1155, and the next resource element candidate is obtained. The process then returns to step 1135 by following a loop from step 1155 to step 1135.

If another resource element candidate is not available, the "NO" branch is followed from step 1150 to step 1160, and an inquiry is conducted to determine whether a previous device configuration exists. If not, the "NO" branch is followed from step 1160 to step 1165. The process branches from step 1165 to step 1300 (FIG. 10D) to obtain the current device configuration in State 4.

On the other hand, if the previous device configuration exists, the "YES" branch is followed from step 1160 to step 1170. In step 1170, the previous device configuration and the state associated with this device configuration is obtained. In addition, the allocated resource element for this device configuration is unallocated. In step 1175, the process branches to step 1150 to determine whether another resource element candidate is available.

Figure 10C:
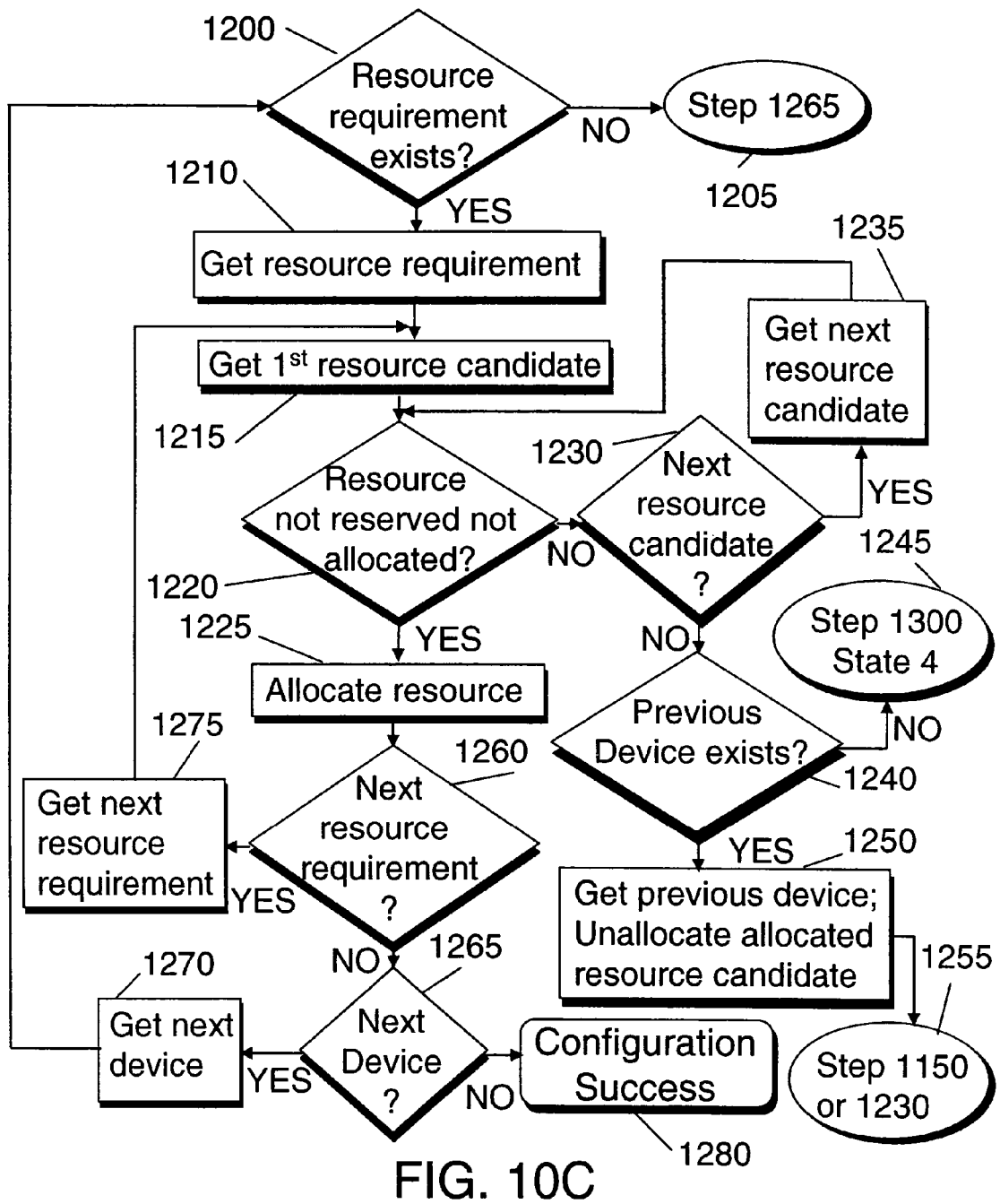
Figure 10D:
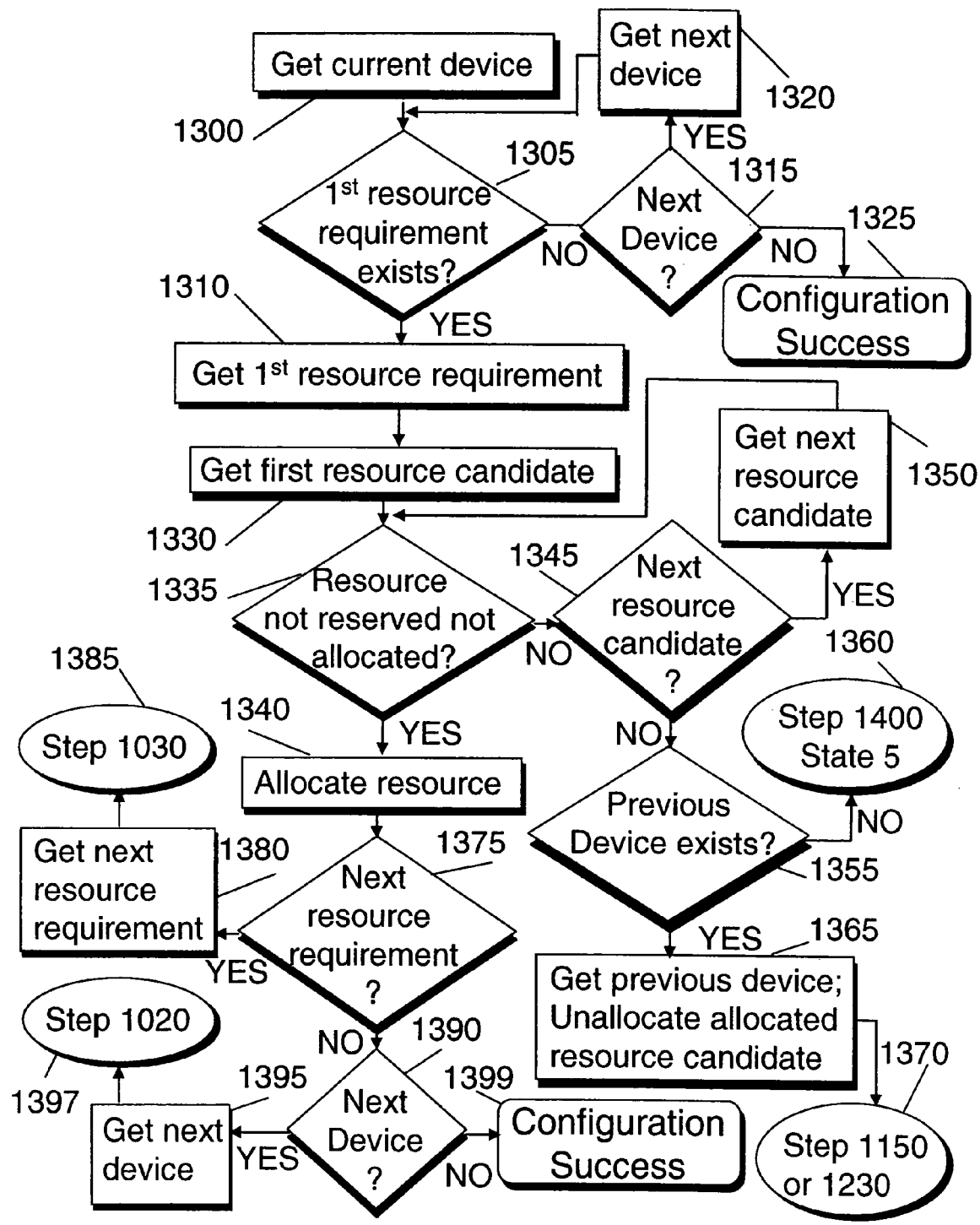
Figure 10E:
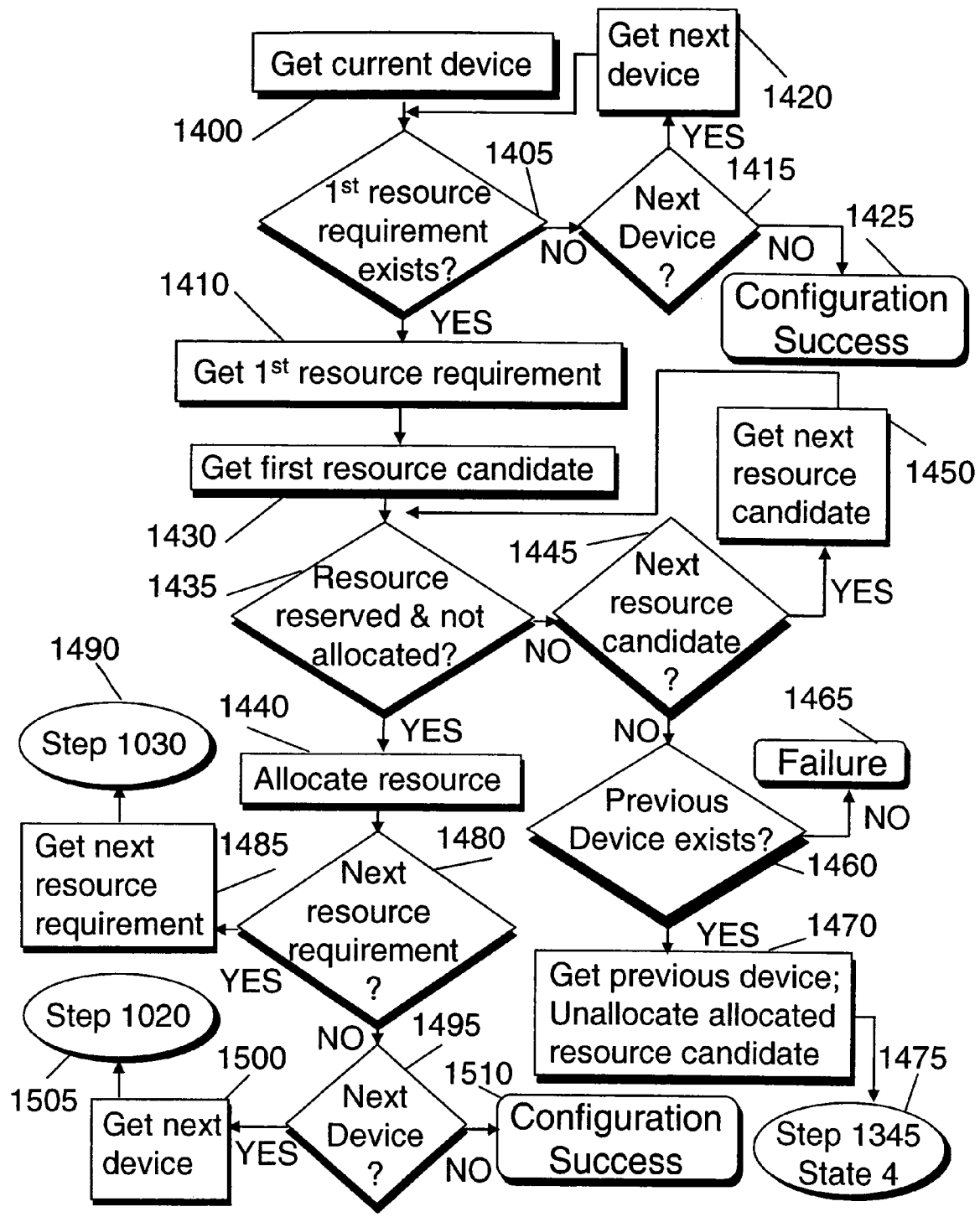

For step 1145, the process branches to step 1260 of FIG. 10C. Referring to FIG. 10C, in step 1260, an inquiry is conducted to determine whether the current device configuration contains another resource element requirement. If not, the "NO" branch is followed from step 1260 to step 1265 to determine whether another device configuration is available from the list of device configurations. If so, the "YES" branch is followed from step 1265 to step 1270, and the next device configuration is obtained. A loop is then followed from step 1270 to the decision box of step 1200.

For the new device configuration, an inquiry is conducted in step 1200 to determine whether the new device configuration contains a resource element requirement. If not, the "NO" branch is followed from step 1200 to step 1205. In step 1205, the process branches to step 1265 to determine whether another device configuration is available from the list of device configurations.

If the new device configuration contains a first resource element requirement, then the "YES" branch is followed from step 1200 to step 1210. In step 1210, a resource element requirement is obtained from the selected device configuration. In turn, a resource element candidate is obtained in step 1215 to check for allocation.

At decision box 1220, an inquiry is conducted to determine whether the selected resource element candidate is (1) nonreserved and (2) nonallocated for use by another of the devices 20. To conduct this inquiry, the arbitrator 154 examines the allocated resource list to determine whether the allocated and reserved resource list contain an entry representing this resource element. If the arbitrator 154 does not find such an entry, the resource element is considered to be nonreserved and available for allocation. In this event the "YES" branch is followed from step 1220 to step 1225, and the resource element is allocated.

If the test is not satisfied in step 1220, the "NO" branch is followed to step 1230, and another inquiry is conducted. In step 1230, a determination is made whether another resource element candidate is available. If so, the "YES" branch is followed from step 1230 to step 1235, and the next resource element candidate is obtained. The process then loops back to step 1220 from step 1235.

If the inquiry conducted in step 1230 resulted in the conclusion that another resource element candidate is not available, the "NO" branch is followed to step 1240. In step 1240, an inquiry is conducted to determine whether a previous device configuration exists. If the response to this inquiry is negative, the "NO" branch is followed to step 1245. In step 1245, the process branches to step 1300 in State 4 (FIG. 10D) to obtain the current device configuration.

If the previous device configuration exists, then the "YES" branch is followed from step 1240 to step 1250. In step 1250, the previous device configuration and its associated state is obtained. In addition, the resource element allocated to this previous device configuration is unallocated. In step 1255, the process branches to step 1150 (FIG. 10B) if the previous device configuration is in State 2 or to step 1230 (FIG. 10C) in the event that the previous device configuration is in State 3. For both steps 1150 and 1230, an inquiry is conducted to determine whether another resource element candidate is available.

In step 1245, the process branches to step 1300 (FIG, 10D) in State 4. Referring to FIG. 10D, at step 1300, the current device configuration is obtained. In step 1305, the current device configuration is examined to determine whether it includes a resource element requirement. If so, the "YES" branch is followed to step 1310 and the resource element requirement is acquired. However, if the response to the inquiry of step 1305 is negative, the "NO" branch is followed to step 1315. In step 1315, a determination is made whether another device configuration is available from the list of device configurations. If so, the "YES" branch is followed to step 1320, and the next device configuration is obtained from the list. The process then loops back to step 1305 from step 1320. If the response to the inquiry of step 1315 is negative, the "NO" branch is followed to step 1325, and a configuration success is declared.

In response to obtaining a resource element requirement of the current device configuration, a resource element candidate is obtained in step 1330. An inquiry is then conducted in step 1335 to determine whether the resource element represented by the resource element candidate is (1) nonreserved and (2) not allocated for use by another device 20. If so, the "YES" branch is followed to step 1340, and the selected resource element is allocated. In contrast, if the response to the inquiry of step 1335 is negative, the "NO" branch is followed to step 1345. A determination is made in step 1345 whether another resource element candidate is available for comparison to the present resource element requirement. If so, the "YES" branch is followed to step 1350, and the new resource element candidate is obtained. The process then loops back to step 1335 from step 1350.

If another resource candidate is not available, the "NO" branch is followed to step 1355. In step 1355, an inquiry is conducted to determine whether a previous device configuration exists. If not, the "NO" branch is followed from step 1355 to step 1360. From 1360, the process branches to step 1400 (FIG. 10E) in State 5 to obtain the current device configuration. However, in the event that the previous device configuration is available, the "YES" branch is followed from step 1355 to step 1365. In step 1365, the previous device configuration and corresponding state are obtained. In addition, the resource element allocated to the previous device configuration is unallocated. From step 1370, the process branches to step 1150 (FIG. 10B) in the event that the previous device configuration is in State 2 or to step 1230 (FIG. 10C) if the previous device configuration is in State 3. This allows the process to determine whether another resource element candidate is available to satisfy the resource element requirement of the device configuration.

In response to allocating a resource element in step 1340, an inquiry is conducted at step 1375 to determine whether the current device configuration includes another resource element requirement If so, the "YES" branch is followed to step 1380, and the next resource element requirement is obtained. From step 1385, the process branches to step 1030 (FIG. 10A) in State 1.

If another resource element requirement is not available, the "NO" branch is followed from step 1375 to step 1390. In step 1390, a determination is made whether another device configuration is available from the list of device configurations. If so, the "YES" branch is followed to step 1395, and the next device configuration is obtained. From step 1397, the process branches to step 1020 (FIG. 10A) in State 1. In the event that another device configuration is not available, the "NO" branch is followed to step 1399, and a configuration success is declared.

From step 1360 of FIG. 10D, the process branches to step 1400 of FIG. 10E to obtain the current device configuration. This current device configuration represents State 5. Referring now to FIG. 10E, the current device configuration is obtained in step 1400, and in step 1405, a determination is made whether this current device configuration includes a resource element requirement. If so, the "YES" branch is followed to step 1410, and the resource element requirement is obtained from the current device configuration. However, if the response to the inquiry in step 1405 is negative, the "NO" branch is followed to the decision box at step 1415. In step 1415, an inquiry is conducted to determine whether another device configuration is available from the list of device configurations. If so, the "YES" branch is followed to step 1420, and the next device configuration is obtained. The process then returns to step 1405 from step 1420. In contrast, if another device configuration is not available in step 1415, the "NO" branch is followed to step 1425, and a configuration success is declared.

Upon obtaining the resource element requirement of the current device configuration in step 1410, the process moves to step 1430 to obtain a resource element candidate. In step 1435, an inquiry is conducted to determine whether the resource element requirement can be satisfied by a resource element that is (1) reserved and (2) not allocated. If so, the "YES" branch is followed to step 1440, and this resource is allocated to the device configuration. However, if the response to the inquiry in step 1435 is negative, the "NO" branch is followed to step 1445. In step 1445, a determination is made whether another resource element candidate is available and, if so, the "YES" branch is followed to step 1450. In step 1450, the next resource element candidate is obtained, and the process then loops back to step 1435.

If another resource element candidate is not available in step 1445, the "NO" branch is followed to the decision box at step 1460. In inquiry is conducted at step 1460 to determine whether a previous device configuration exists. If not, the "NO" branch is followed to step 1465, and a configuration failure is declared. However, if a previous device configuration exists, then the "YES" branch is followed from step 1460 to step 1470. The previous device configuration and corresponding state are obtained in step 1470. In addition, the resource element allocated to this previous device configuration is unallocated in step 1470. From step 1475, the process branches back to step 1345 (FIG. 10D) in State 4 to inquire whether another resource element candidate is available for this previous device configuration.

Upon allocating a resource element in step 1440, an inquiry is conducted in step 1480 to determine whether another resource element requirement is defined by the selected resource element requirement. If so, the "YES" branch is followed to step 1485, and the next resource element requirement is obtained. From step 1490, the process then branches to step 1030 (FIG. 10A) in State 1 to obtain a resource element candidate for comparison to this new resource element requirement.

If the inquiry in step 1480 returns a negative response, the "NO" branch is followed to step 1495. In inquiry is conducted at step 1495 to determine whether another device configuration is available. If so, the "YES" branch is followed to step 1500, and the next device configuration is obtained. In turn, at step 1505, the process branches back to step 1020 (FIG. 10A) in State 1 to determine whether this new device configuration contains a first resource element requirement.

If the response to the inquiry in step 1495 is negative, the "NO" branch is followed to step 1510, and a configuration success is declared.

It will be appreciated that the preferred resource arbitration process can be optimized to handle a device configuration defining a resource element requirement of a particular resource element. For example, a particular resource element can be defined by a single resource element, such as port 2C0, or by a specified range of resource elements, such as ports 2C0-2CF. In view of the resource element requirement for a particular resource element, the resource arbitration process can bypass a test that requires an examination of any reserved resource element. In other words, the process can be optimized by eliminating an examination of the entries of the reserved resource list for tasks requiring this review if the present device configuration includes a resource element requirement specifying a particular resource element. This optimization of the resource arbitration process affects steps 1035, 1135, 1220, 1335, and 1435 of FIGS. 10A-10E.

For the preferred resource arbitration system, each arbitrator 154 is assigned to one of the resources 14 for the computer 8. As previously described, the resources 14 for a conventional personal computer include addresses for the memory 22, interrupts 24, DMA channels 26, and I/O ports 28. Nevertheless, it will be appreciated that the resources 14 also can represent any type of resource having a finite quantity of resource elements which can be assigned for use by multiple consumers.

For example, power consumption represents another type of resource because the power supply for a conventional personal computer is capable of supplying a finite amount of electrical power for use by the components of that computer. Thus, power consumption can be divided among multiple power consumers, specifically the active components of the computer. It will therefore be appreciated that an arbitrator 154 can be developed and used for the allocation and assignment of electrical power to the components of a computer to conserve power consumption.

Other examples of computer resources include SCSI identification codes, device identification codes, bus arbitration levels, and logical drive designations. Similar to the example for the power consumption arbitrator, it will be appreciated that the resource allocation concept of the arbitrators 154 can be extended to these type of resources.

Although the preferred environment for the present invention is a personal computer, it will be appreciated that the invention is also applicable to other types of data processing systems having resources that support the processing operations of the data processing system. Indeed, those skilled in the art will recognize that the principles of the present invention can be extended to other computer architectures and operating systems and are not limited to standard computer architectures or the preferred operating system described herein. Specifically, the inventors envision that the present invention is extendible to present and future bus architectures, device types, and network configuration routines.

It will be understood that the configuration system described herein provides a system for automatically configuring devices for operation with a computer. For devices that are capable of identifying themselves and declaring their services and resource requirements, the configuration system supports installation and configuration of such devices without user intervention. Devices of the computer are configured by identifying the devices, determining the resource requirements of those devices, detecting and resolving potential conflicting uses of the resources, and allocating the resources for use by the devices.

While there has been shown and described the preferred embodiment of the invention, it will be evident to those skilled in the art that various modifications and changes may be made thereto without departing from the spirit and the scope of the invention as set forth in the appended claims and equivalents thereof.

We claim:

1. For a computer having at least one resource, a method for allocating elements of the resource for use by devices of the computer, the devices including boot devices that are activated during the power-up of the computer and basic devices that are activated after the power-up of the computer, the method comprising the steps of:

obtaining a list of boot device configurations based on logical configuration data obtained from the boot devices, said logical configuration data defining resource elements for the operation of a corresponding boot device, each boot device configuration defining a requirement for one of the resource elements to support the operation of a corresponding one of the boot devices with the computer;

determining whether resource elements are available to satisfy the resource element requirements for each of the boot device configurations;

if so, then allocating the available resource elements to the boot device configurations, otherwise declaring configuration failure;

obtaining a list of basic device configurations based on resource requirement information or resource dependency information obtained from the basic devices, each basic device configuration defining a requirement for one of the resource elements to support the operation of a corresponding one of the basic devices with the computer; and determining whether resource elements are available to satisfy the resource element requirements for each of the basic device configurations;
- if so, then allocating the available resource elements to the basic device configurations; otherwise declaring configuration failure.

2. In a computer having a plurality of resources, an apparatus for allocating elements of the resources for use by devices of the computer, comprising:
- a central processing unit (CPU) for executing instructions to support the operations of the computer;
- a memory connected to the CPU; and
- a program module, stored in the memory, for generating a set of the instructions, the program module including:
- a configuration manager that develops a list of device configurations based on logical configuration data obtained from the devices, said logical configuration data defining resource elements for the operation of a corresponding device and each device configuration defining a requirement for one of the resource elements to support the operation of a corresponding one of the devices with the computer, the resource elements including nonreserved resource elements and reserved resource elements; and
- an arbitrator for each of the resources, responsive to the list of device configurations, that determines whether the resource elements are available to satisfy the resource element requirements defined by the device configurations, wherein the arbitrator allocates the available resource elements in the event that the arbitrator determines that resource elements are available to satisfy the resource element requirements defined by the device configurations, and wherein the arbitrator sends to the configuration manager an error message representing configuration failure in the event that the arbitrator fails to determine that resource elements are available to satisfy the resource element requirements defined by the device configurations, wherein the devices include at least one system bus.

3. The apparatus of claim 2, wherein the reserved resource elements represent a set of the resource elements that are held in reserve for possible use by selected devices, and the nonreserved resource elements represent the remaining resource elements.

4. The apparatus of claim 2, wherein at least one device is connected to the at least one system bus, and wherein resources are allocated to the at least one device after the resources have been allocated to the at least one system bus.

5. The method of claim 1, wherein at least one of the basic devices is a system bus, the at least one system bus connecting to a patent system bus and a plurality of additional child devices.

6. The method of claim 5, wherein devices are connected to the system bus and resources are allocated to the devices connected to the bus after the resources have been allocated to the system bus.

* * * * *